(12) United States Patent
Lehmann

(10) Patent No.: US 9,645,040 B2
(45) Date of Patent: May 9, 2017

(54) METHOD OF INLINE INSPECTING AND/OR TESTING DEVICES AND APPARATUS TO PERFORM SUCH METHOD

(71) Applicant: WILCO AG, Wohlen (CH)

(72) Inventor: Martin Lehmann, Wohlen (CH)

(73) Assignee: WILCO AG, Wholen (CH)

( * ) Notice: Subject to any disclaimer, the term of this patent is extended or adjusted under 35 U.S.C. 154(b) by 0 days.

(21) Appl. No.: 14/779,868

(22) PCT Filed: Mar. 27, 2013

(86) PCT No.: PCT/EP2013/056609
§ 371 (c)(1),
(2) Date: Sep. 24, 2015

(87) PCT Pub. No.: WO2014/154269
PCT Pub. Date: Oct. 2, 2014

(65) Prior Publication Data
US 2016/0054194 A1 Feb. 25, 2016

(51) Int. Cl.
*G01M 3/32* (2006.01)
*G05B 19/418* (2006.01)
*G01M 3/22* (2006.01)

(52) U.S. Cl.
CPC .......... *G01M 3/3272* (2013.01); *G01M 3/229* (2013.01); *G01M 3/329* (2013.01); *G01M 3/3263* (2013.01); *G01M 3/3281* (2013.01); *G05B 19/4183* (2013.01); *G05B 2219/31432* (2013.01); *G05B 2219/40554* (2013.01); *Y02P 90/02* (2015.11); *Y02P 90/10* (2015.11); *Y02P 90/28* (2015.11)

(58) Field of Classification Search
None
See application file for complete search history.

(56) References Cited

U.S. PATENT DOCUMENTS

| | | | |
|---|---|---|---|
| 3,879,987 A * | 4/1975 | Yasuhiro | G01M 3/3209 141/165 |
| 5,749,205 A | 5/1998 | Edwards et al. | |
| 2006/0091842 A1 | 5/2006 | Nishiyama | |

(Continued)

FOREIGN PATENT DOCUMENTS

| | | |
|---|---|---|
| JP | H11-23409 A | 1/1999 |
| WO | 2011/012730 A2 | 2/2011 |

OTHER PUBLICATIONS

Oct. 8, 2015 International Preliminary Report on Patentability issued in International Application No. PCT/EP2013/056609.

(Continued)

*Primary Examiner* — Robert R Raevis
(74) *Attorney, Agent, or Firm* — Oliff PLC

(57) ABSTRACT

Inspecting and/or testing of inline conveyed devices is performed in that a monitoring unit is applied to a device. The monitoring unit is removed in a removing area. Within the timespan the monitoring unit is applied to the device, the monitoring unit is operated in a standalone operating mode. During a timespan information about the device to which the monitoring unit is applied is collected in the monitoring unit. This timespan of collecting includes at least a part of the timespan during which the monitoring unit is operated in standalone mode.

64 Claims, 11 Drawing Sheets

(56) References Cited

U.S. PATENT DOCUMENTS

2011/0134973 A1  6/2011  Keyes, IV et al.

OTHER PUBLICATIONS

Sep. 29, 2015 International Preliminary Report on Patentability issued in International Application No. PCT/EP2013/056609.
Nov. 22, 2013 International Search Report and Written Opinion issued in International Application No. PCT/EP2013/056609.
Dec. 19, 2017 Office Action issued in Japanese Patent Application No. 2016-504500.

\* cited by examiner ized. The filed Mar. 27, 2013.

METHOD OF INLINE INSPECTING AND/OR TESTING DEVICES AND APPARATUS TO PERFORM SUCH METHOD

RELATED APPLICATION

This is a U.S. National Phase Application under 35 U.S.C. §371 of International Application No. PCT/EP2013/056609 filed Mar. 27, 2013.

TECHNICAL FIELD

The present invention is directed on a method of inline inspecting and/or inline testing devices.

BACKGROUND AND SUMMARY

Customary methods for inline inspecting and/or testing devices comprise inline conveying the devices to be tested. Along the conveying path, depending upon the type of device and the type of inspecting and/or testing to be performed, a respective monitoring unit is applied on or over a respective device. Such a monitoring unit generically comprises an information collecting unit by which information is collected from or caused by the device under inspection and/or test. The collecting unit may thereby, as an example, comprise respective sensors as e.g. one or more than one pressure sensor, temperature sensor, picturing sensor, gas species sensor, force sensor, etc. The collected information is customarily transmitted to an evaluation unit as to a computer stationary on the apparatus. The one or more than one monitoring units are conveyed with the devices, wire-bound to the apparatus, up to an area where they are removed from the respective devices and are conveyed back to be reapplied to subsequent devices of the inline stream of devices.

The timespan which is thereby available for collecting information from or caused by the device is, at a given throughput rate of the inline stream of devices, dependent from the extent of conveying path between applying the monitoring units to the devices and removing them from the devices. Because the throughput rate of inline inspecting and/or testing should be as high as possible and because each inspection and/or test of a device necessitates a respective predetermined timespan for collecting information, so as to get accurate results, the respective apparatus and thereby especially that part of the apparatus between an application area for the monitoring unit and a removal area where the monitoring unit is removed from the device becomes more and more space-consuming and complex, due to the path the monitoring units are conveyed with devices and connected to the evaluation unit.

Moreover each apparatus conceived to perform specific inspection and/or testing is constructed with an application-specific conveying path between the addressed area of application and the addressed area of removal of the monitoring units to or from the devices.

It is an object of the present invention, under the aspect of its methods as well as of its apparatus, to improve prior art methods and apparatus.

This is accomplished by the methods of inline inspecting and/or testing devices which comprises:
Providing at least one monitoring unit capable to be releasably applied to or over one of said devices and, in a standalone operating mode, to collect information from and/or caused by such device;
Conveying devices inline towards and into an application area;
Applying on or over a device out of the devices which are inline conveyed towards and into the application area the monitoring unit in the application area;
Removing the monitoring unit from the device in a removal area and conveying the removed monitoring unit to the application area;
By the monitoring unit, collecting information from or caused by the device it is applied to;
Transmitting depending from information collected in the monitoring unit to a remote unit which is stationary with respect to the inline conveying of the devices towards and into said application area;
Evaluating information dependent from information as collected;
and wherein
The addressed collecting is performed during a collecting timespan;
The monitoring unit is operated in standalone operating mode during a standalone timespan;
The monitoring unit is applied to or over the device during an application timespan;
The standalone timespan includes at least a part of the application timespan and
The collecting timespan includes at least a part of the addressed part of the application timespan.
Definition:
We understand throughout the present description and claims as "standalone" operating mode an operating mode of the monitoring unit in which no energy transmission by wire or, more generically, by solid material connection is transferred to the monitoring unit or from the monitoring unit to other parts of the apparatus. As examples, in the addressed "standalone" operating mode no electric supply power is fed to the monitoring unit by cable connection, no electric signals, e.g. for controlling the monitoring unit or for reporting a status of the monitoring unit to other parts of the apparatus, is performed via a wired link to the monitoring unit. Further, information collected in the monitoring unit and/or dependent from such collected information may not be transferred to another part of the apparatus by a wired connection, cooling or heating of the monitoring unit my not be performed by mechanically "wired" heat exchange members to the monitoring unit. Thus, in this standalone operating mode the monitoring unit is free of any solid energy transmitting link. Please note that throughout the present description and claims, the term "wire-bound" addresses the opposite status to "standalone". In this status the monitoring units is connected to another part of the apparatus by a solid material energy transmission line.

Thus, at least during a part of the time a monitoring unit is applied to the devices the addressed monitoring unit is operated in standalone operating mode. The monitoring unit is thus operated in standalone operating mode at least during a part of the application timespan. Thus performing collecting information during the addressed application timespan and in standalone operating mode results in a high flexibility to adapt the collecting timespan. Information is collected by the monitoring unit at least during a part of the application timespan during which the monitoring unit is operated in standalone operating mode.

Having a closer look to the application timespan during which a monitoring unit is applied to one of the devices inline conveyed towards the application area, in one embodiment of the method according to the invention which may be combined with any embodiment to be addressed, unless in contradiction, the device with the monitoring unit applied thereto is conveyed in line with other devices, with or without monitoring unit applied thereto, towards and into the removal area. During this conveyance there might be provided a phase during which the addressed device with the monitoring unit applied thereto is kept stationary so as to increase the application timespan without lengthening the conveying path and thereby lengthening the collecting timespan during the addressed phase of standstill.

In one embodiment of the method according to the invention which may be combined with any embodiment to be addressed, unless in contradiction, the removal area may be located substantially at the same locus of the apparatus as the application area. If thereby the device with the monitoring unit applied thereto is inline conveyed with other devices, with or without monitoring units from the application area to the removal area, this means that the respective conveying path loops from the locus of the application area to the same locus of the removal area.

Still in a further embodiment of the method according to the invention which may be combined with any embodiment to be addressed, unless in contradiction, the device with the monitoring unit applied thereto is kept stationary during the entire application timespan. This means that at least that device to which a monitoring unit is applied is kept stationary after the monitoring unit having been applied thereto up to the moment at which the monitoring unit is removed from the device. Thereby, the application area and the removal area are located substantially at the same locus of the apparatus.

In any case, during the application timespan there exists a timespan during which the monitoring unit is operated in standalone operating mode and a second timespan, at least overlapping the first one, in which collecting information is performed by the monitoring unit.

Thereby, collecting information in the monitoring unit may at least to a part be performed when the monitoring unit has left standalone operating mode or the addressed application timespan has yet not begun or has already ceased. This means that the collecting timespan may start before the application timespan and/or may end after the application timespan.

If the overall apparatus is e.g. to be adapted from short collecting timespans to longer collecting timespans this may be flexibly done just by lengthening that part of the application timespan, during which collecting is performed, thus in one embodiment by lengthening the conveying path between the application area and the removal area there, where collecting of information is performed by the monitoring unit applied to the device and operated in standalone operating mode. Instead of lengthening the conveying path or additionally, during that part of the addressed application timespan a buffer chamber may become effective in which the devices are fed to and removed from at an equal rate, but wherein the devices are conveyed slower or are even stationarily stocked to gain collecting timespan. It goes without saying that, generically spoken, inspecting and/or testing becomes more accurate the more time is available to collect, at a predetermined collecting rate, information from or caused by the device to be inspected and/or tested. Because in the standalone operating mode there is no wire-bound energy transmitting connection between the monitoring unit and the remainder of the overall apparatus, flexibly amending the application timespan when the monitoring unit on the device is in standalone operating mode is feasible without complex constructional amendments to the apparatus. This just because along that part of the application timespan the monitoring unit is operated in standalone operating mode.

Thus, it becomes possible to adapt an overall apparatus from one type of devices to another type and/or from one type of inspecting and/or testing to another one primarily by changing the application timespan at an instance when the monitoring unit is in standalone operating mode. Additionally such adaptation may possibly necessitate exchanging one type of monitoring unit by another.

Thus and as was addressed, in one embodiment according to the invention, which may be combined with all embodiments already addressed and still to be addressed, unless in contradiction, the devices with the device on or over which the monitoring unit is applied are inline conveyed from the application area towards and into the removal area.

In one embodiment of the method according to the present invention, which may be combined with all embodiments already addressed and still to be addressed, unless in contradiction, the application area and the removal area are provided at least substantially at the same locus or are, alternatively, mutually remote.

In one embodiment of the method according to the invention, which may be combined with all addressed embodiments and embodiments still to be addressed, unless in contradiction, the application area and the removal area are provided substantially at the same locus and at least the device with a monitoring unit applied thereon or thereover is kept stationary during the application timespan.

According to one embodiment of the method according to the present invention, whereat the devices with the device on or over which the monitoring unit is applied, are inline conveyed from the application area towards and into the removal area, irrespective whether the application area and the removal area are located at the same locus or are mutually remote, the device with the monitoring unit applied thereto is kept stationary during a timespan of the addressed conveying from the application area to the removal area.

In one embodiment of the method according to the invention, which may be combined with all embodiments already addressed and still to be addressed, unless in contradiction, the collecting timespan starts before, with or after the application timespan. If the collecting timespan starts before, information is collected e.g. during the application of the monitoring unit onto or over the respective device. Such information may e.g. be indicative for proper applying. Starting the collecting timespan with of after initiating the application timespan may take into account unstable, transient behavior during applying the monitoring unit to the device, which would possibly influence testing and/or inspecting results.

Irrespective whether the collecting timespan starts before, with or after initiating the addressed application timespan, such collecting timespan includes a part of the standalone timespan.

In a further embodiment of the method according to the invention which may be combined with any embodiment already addressed or still to be addressed, unless in contradiction, the collecting timespan starts before or with or after start of the standalone timespan.

If the collecting timespan starts before the standalone timespan, this means that collecting is already performed when the monitoring unit is still wire-bound linked for energy transfer to stationary parts of the overall apparatus, be it, as example, by an electronic charging line for a power supply of the monitoring unit, or by control acknowledgement signal wires, by information transmission wires or other energy-transmitting links as for vacuumizing or pressurizing, heat transfer links etc. If the collecting timespan starts with or after start of the standalone timespan, this means that information collecting is performed at the monitoring unit, at least in an initial phase, when the monitoring unit is already operated in standalone operating mode and such collecting may be performed completely independent from wired connections to other parts of the overall apparatus, i.e. locally in fact anywhere.

In a further embodiment of the method according to the invention, which may be combined with any embodiment already addressed or to be addressed, unless in contradiction, the standalone timespan of the monitoring unit is ongoing during the application timespan and during being brought from the removing area back to the application area e.g. by conveying. This means that the monitoring unit is in fact permanently in standalone operating mode along the loop—application area—removal area—application area—and all energy transfer to or from the monitoring unit, from or to the remainder of the apparatus is performed not wire-bound and thus wirelessly.

E.g. if the monitoring unit is, in operation, never wire-bound to the remainder of the apparatus, a maximum freedom for adapting the monitoring unit and its operation to specific needs for respective devices and their inspection and/or testing is achieved.

In a further embodiment of the method according to the invention, which may be combined with any of the preaddressed embodiments or of the embodiments still to be addressed, unless in contradiction, the standalone timespan starts at the latest with the application timespan. This means that if any wire-bound connection or link for energy transfer is installed between the monitoring unit and the remainder of the apparatus, such wire-bound connection or link is removed at the latest when the monitoring unit is applied on or over the respective device.

In one embodiment of the method according to the invention, which may be combined with any preaddressed embodiments and embodiments still to be addressed, unless in contradiction, the collecting timespan ends before, with or after the application timespan. If the collecting timespan ends before the addressed application timespan, this means that the monitoring unit remains applied to or over the respective device, even as collecting information at the monitoring unit has ceased. This may be advantageous e.g. if after the collecting timespan evaluation of information dependent from information as collected is performed, and a result of such evaluation is written to the monitoring unit for latter selection of the respective device, e.g. according to having passed or having not passed inspection or testing. Keeping the monitoring unit applied to the device after termination of collecting information in fact allows to identify the device by the monitoring unit applied thereto for further processing of the device.

If the collecting timespan ends with or after the addressed application timespan it becomes possible to collect and hold information including information about occurrences at or during the removing action. Such information may be important e.g. to check on proper previous application of the monitoring unit to the device.

Moreover and as the monitoring unit is removed from the respective device and collecting of information goes on at least a part of transmitting information from the monitoring unit to the remote unit is performed without any time limit as the monitoring unit is then separate from the device to be further processed.

In a further embodiment of the method according to the invention, which may be combined with any preaddressed embodiment or embodiments still to be addressed, unless in contradiction, the collecting timespan ends before, with or after the end of the standalone timespan.

If the collecting timespan ends before the standalone timespan, collecting and holding information at the monitoring unit is not affected by applying wired connections or links to the monitoring unit for energy transfer. Please note that such application of the addressed wire-bound links or connections means terminating the standalone operating mode of the monitoring unit.

If the collecting timespan ends with or after the end of the standalone timespan it becomes possible to include in the collected information which is significant for proper/unproper application of the addressed wire-bound links or connections. Such information may be relevant to establish whether a junction of such a wire-bound connection to the monitoring unit, as e.g. for wired transmission of information dependent from information as collected in the monitoring unit, is properly established.

In a further embodiment of the method according to the invention which may be combined with any of the already addressed and of the still to be addressed embodiments, unless in contradiction, the standalone timespan ends before or after transmitting information dependent from information as collected in the monitoring unit to the remote unit. If the standalone timespan ends before the addressed transmitting this means that such transmitting may be performed by applying a wire-bound transmission link to the monitoring unit, e.g. a metal wire connection or an optical fibre connection. If, on the other hand, the standalone timespan ends after such transmitting, this means that transmitting of information dependent from information as collected in the monitoring unit to the remote unit is performed in a wireless manner.

In a further embodiment of the method according to the invention, which may be combined with any of the preaddressed embodiments or with any of the embodiments still to be addressed, unless in contradiction, transmitting of the information dependent from information as collected in the monitoring unit to the remote unit is performed before or after the end of the application timespan. If transmitting is performed before removing the monitoring unit from the device, it becomes possible to write information e.g. about the result of an evaluation back to the monitoring unit still applied to the device. Thereby, indirectly, the respective device is marked with such information, which may be exploited for later decision how the respective device is be further processed.

If transmitting is performed after such removing, it becomes possible to convey the monitoring unit which has left its respective device to a transmitting station remote from the removal area. This may e.g. be a valid approach if the transmission of information lasts longer time.

In an embodiment of the method according to the invention, which may be combined with any preaddressed embodiments or with embodiments still to be addressed, unless in contradiction, the information collected in the monitoring unit is at least one of a gas pressure, a gas pressure course, an amount of a gas species in a gas, a course of such an amount, a temperature, a temperature course, an optical characteristic in the visible and/or invisible light spectrum, a course of such optical characteristic, a reaction upon radiation, a course of such reaction, electric impedance, a course of such impedance, a force, a course of such force.

The information as collected in the monitoring unit may thus be a gas pressure or a gas pressure course. This is e.g.

the case if a close or an open container is tested on leakiness. Generically spoken, if a pressure difference is established between the surrounding of such container and the inside of such container, in the case of leakiness, the inside pressure and/or the pressure in the surrounding of the container will vary over time due to pressure equalization through the leak. Thus, as an example in this case a gas pressure or a gas pressure course is collected and information dependent therefrom is exploited.

We thereby understand under a "course" throughout the present description and claims the development of the respectively addressed entity over time.

The information collected in the monitoring unit may be the amount of a gas species in a gas or a course of such an amount. This may be the case e.g. if, as a device, a close container is pressurized with a gas which comprises a predetermined gas species. If a leak is present the pressurized gas is flowing out of the container into the container's surrounding. The gas in the surrounding is collected by the monitoring unit, e.g. in a sample compartment. Thereby, the gas in the sample compartment contains the relevant information, namely the amount of the gas species. By establishing a gas flow communication from such sample compartment in the monitoring unit to the remote unit, which is realized as a gas analyzer unit, the information, namely the content or amount of the addressed predetermined gas species as a piece of information, is transmitted to the gas analyzing remote unit, which analyzes the gas sample and specifically the amount of the addressed gas species as a test result. By taking gas samples at subsequent times into more than one sample compartment in the monitoring unit and analyzing such samples, the course of the addressed amount of gas species may be evaluated.

Further, the information collected in the monitoring unit may be a temperature or temperature course. Collecting temperature information may be done by a temperature sensor arrangement or by infrared picturing as e.g. for testing on leakiness of close liquid- or gas-filled containers.

The information collected and held in the monitoring unit may be an optical characteristic or a course of such optical characteristic in the visible and/or invisible light spectrum. This may be e.g. the visible or infrared optical appearance of a device, e.g. for inspecting upon shape, damages, proper assembling, leakiness of such a device. Otherwise, the content of a transparent container may be tested e.g. in that the container is exposed to a laser beam and absorption of such laser beam is sensed as an indication of the content of the addressed container.

Further, the addressed information which is collected in the monitoring unit may be a characteristic with respect to a reaction upon radiation or a course of such radiation. E.g. if the structural integrity of a device shall be inspected such device may be exposed to X-ray radiation. The X-ray picture of the device as a reaction of the device upon such radiation is held e.g. by the monitoring unit for subsequent evaluation. Multiple picturing allows evaluation of a respective course.

Further, the addressed information collected in the monitoring unit may be electric impedance, i.e. conductance, capacitance, inductivity and combinations thereof or a course of such impedance. E.g. if a container containing a liquid product is to be leak tested, sensing the electric impedance, e.g. the conductance along the outer wall of such container may be indicative for leakiness.

Still further, the addressed information as collected by the monitoring unit may be a force or a course of such force. As an example, if a close container with elastic wall containing e.g. a gas is to be leak tested, this may be performed by exerting a bias from the exterior upon such container and either measuring the reaction force on such bias or the force with which the container bulges out due to the addressed biasing. Thus, monitoring a force or a course of such force may be information about leakiness of a container.

In fact these examples show that the present invention may be applied to a large variety of inspecting and/or testing techniques as long as collecting the respective information from the device or of information which is caused by the device may be performed nearby the device and in a standalone operating mode.

In one embodiment of the present invention, which may be combined with all preaddressed embodiments and with all embodiments still to be addressed, unless in contradiction, the information as collected in the monitoring unit is an amount of a predetermined gas species in a gas surrounding the device. Collecting of that information in the monitoring unit comprises collecting a sample of the gas surrounding the device into a sample compartment within the monitoring unit. Evaluating thereby comprises gas analysis, being performed, as an example, by a mass spectrometer in the remote unit. Information held in the sample compartment in the monitoring unit is transmitted by establishing a gas flow communication from the sample compartment to the remote unit.

In a further embodiment of the present invention, which may be combined with any preaddressed embodiments or embodiments still to be addressed, unless in contradiction, the information as collected in the monitoring unit comprises a gas pressure or gas pressure course. Collecting of the addressed information comprises collecting pressure information by means of a pressure sensor arrangement applied by the monitoring unit to or adjacent to the device.

In one variant of the just addressed embodiment the device is a close container. Applying the monitoring unit results in a sealed interspace between the close container and the monitoring unit. The pressure sensor arrangement senses pressure in the addressed interspace.

In a variant of the just addressed embodiment, the pressure in the interspace is risen above or reduced below the pressure prevailing in the close container at least one of during or before the standalone timespan.

If such rising or reducing is to be performed during the standalone timespan, the monitoring unit may comprise a pressurizing or vacuumizing source e.g. a prepressurized or pre-vacuumized compartment, which is brought in flow communication with the addressed interspace during the standalone timespan. If such rising or reducing is to be performed before the standalone timespan, it may be performed by means of a respective pressure- or vacuum-source remote from the monitoring unit, linked to the monitoring unit and to the interspace by means of a gas flow line, i.e. wire-bound.

In one further embodiment, in which collecting comprises collecting pressure information by means of a pressure sensor arrangement, the device is an open container. Applying the monitoring unit results in sealingly applying the pressure sensor arrangement in flow communication with the inside of the open container. A pressure difference between the inside of the container and the surrounding of the container is established, once the sealed flow communication is established.

In an embodiment of the present invention which may be combined with any preaddressed embodiments and embodiments still to be addressed, unless in contradiction, the monitoring unit is electrically supplied at least during the standalone timespan by means of an electrical power supply source in the monitoring unit.

Such electrical power supply source may be a battery or a rechargeable battery- or capacity arrangement.

In one variant of the just addressed embodiment the electric power supply source is wirelessly recharged at least one of before, during and after the standalone timespan. Thereby, one is utmost flexible to perform wireless recharging, as by inductive recharging, in dependency of the electric power consumption by the monitoring unit, especially during the standalone timespan. Wireless recharging may be performed once or several times before the standalone timespan and/or once or more than once during the standalone timespan and/or once or several times after the standalone timespan. Thus and if the monitoring unit has a high power consumption, wireless charging may be performed permanently along the loop of the monitoring unit from the application area to the removal area and back to the application area, or just permanently during the standalone timespan.

In an embodiment of the method according to the present invention, which may be combined with any preaddressed embodiment and any embodiment still to be addressed, unless in contradiction, performing the collecting of information at the monitoring unit is performed at at least one discrete time interval and transmitting the information dependent from the collected information is performed during that addressed time interval.

Thereby, information from or caused by the device is sampled in the addressed at least one discrete time interval, in fact as a sampled measurement, and the information dependent therefrom is transmitted to the remote unit at least substantially during the addressed time interval. Because collecting and transmitting is performed in the same time interval, no intermediate holding of information in the monitoring unit in the sense of storing is necessary. Thereby, a transmission link between the monitoring unit must be established at the addressed at least one time interval, which means that either there is applied a wirebound connection from the monitoring unit to the remote unit during the addressed time interval, or during the addressed time interval, the monitoring unit is in wireless communication with the remote unit, especially if at that time interval the monitoring unit is operated in standalone operating mode. Nevertheless, it should be noted that it is absolutely possible to perform collecting and transmitting of some information at respective different time intervals, thereby necessitating holding or storing information in the monitoring unit and additionally to perform collecting and transmitting practically simultaneously as was addressed.

In one variant of the embodiment just addressed the collecting is performed at more than one discrete time interval and transmission is performed during the respective time intervals. Thereby, it becomes possible to sample practically point by point the course of the information and to transmit such sampled measurements without intermediate holding or storing at the monitoring unit.

Thereby, at least the one or one of the more than one discrete time intervals are located in the standalone timespan, which necessitates in this variant that at the addressed one time interval in the standalone timespan transmission communication between the monitoring unit and the remote unit is established wirelessly.

In an embodiment of the method according to the present invention, which may be combined with any preaddressed embodiment and with any of the embodiments still to be addressed, unless in contradiction, the information collected or the information dependent therefrom is held or stored in the monitoring unit at least up to performing transmitting. In this embodiment the moment of transmitting information from the monitoring unit to the remote unit becomes independent from the moment or timespan at which information is collected in the monitoring unit. Thus, as an example the information may be collected during the standalone timespan, whereas the respective information as held and stored in the monitoring unit is transmitted to the remote unit later e.g. when the monitoring unit is in wire-bound operating mode or is already removed from the device.

In an embodiment of the method according to the present invention, which may be combined with any embodiment as already addressed or with any embodiment still to be addressed, unless in contradiction, the information collected in the monitoring unit or information dependent therefrom is evaluated in the monitoring unit and the information transmitted comprises a result of such evaluation. Thereby, we understand under "evaluation" an operation to which input signals, namely the addressed collected information or information dependent therefrom, is input and as an output there results different information as a result of operations upon the input information as of comparing, multiplying, dividing, adding, subtracting, filtering, etc. If the information as transmitted has not been evaluated in the monitoring unit or has not completely been evaluated in the monitoring unit, then the remote unit performs the evaluation or the remaining evaluation as necessary.

Wireless transmission may be performed over a short transmission range, e.g. of 10 cm, and at a specific locus along the path of the monitoring unit, practically as a transmission burst, thereby minimizing electric power consumption for such transmission.

In an embodiment of the present invention, which may be combined with any of the preaddressed embodiments and of the embodiments still to be addressed, if not in contradiction, multiple monitoring units are provided and are preferably subsequently applied to subsequent of the devices as inline conveyed towards and into the application area.

Thereby, inspection and/or testing of the inline conveyed devices may be performed at randomly or regularly selected devices, regularly in the sense that any n-th device conveyed to and into the application area is furnished with a monitoring unit.

It is also possible to apply more than one monitoring unit simultaneously to the respective number of devices.

In a further embodiment of the invention, which may be combined with any of the preaddressed embodiments and embodiments still to be addressed, if not in contradiction, multiple monitoring units are provided and are preferably subsequently applied to all subsequent of the devices as inline conveyed towards and into the application area.

In a further embodiment of the method according to the invention, which may be combined with any preaddressed embodiment and with any embodiment still to be addressed, unless in contradiction, information dependent from the information as collected is evaluated and the result of such evaluation is stored in a storage in the monitoring unit. As addressed above evaluation may thereby be performed in the monitoring unit or in the remote unit or in both. The stored result of such evaluating is read out from the monitoring unit and a selecting unit of the apparatus is controlled by such read-out result for selecting further processing of the respective device.

Thus, after having stored the result of evaluating into the monitoring unit the device still combined with the monitoring unit or just having left the monitoring unit becomes attributed by such result as e.g. having passed or not passed the respective inspection and/or test. A selecting unit, which may be said to operate like a junction plate of a railway, is controlled by the stored result, to select how the device shall be further processed. Thereby, the monitoring unit may be removed from the device shortly upstream or downstream the selecting unit.

In an embodiment according to the method of the present invention, which may be combined with any of the preaddressed embodiments and embodiments still to be addressed, if not in contradiction, the devices are inline conveyed from the application area towards and into the removal area which conveying comprises inline conveying the devices by means of at least one band conveyor.

By realizing a conveying from the application area to the removal area to comprise at least one band conveyor the extent or length of conveying path may be flexibly adapted to different needs for the application timespan and thus for the collecting timespan. The monitoring unit is operated in standalone operating mode along such at least one band conveyor.

If the addressed timespan should e.g. be lengthened, either to increase inspection and/or testing accuracy or for adaptation to other devices and/or inspections and/or tests to be performed, this is just performed by providing a different or adding a further band conveyor.

The present invention is further directed on a method for manufacturing devices which have positively passed an inspection and/or test. This method comprises providing uninspected and/or untested devices, inline inspecting and/or testing the uninspected and/or untested devices by the method of inspecting and/or testing as addressed above, possibly in one or more than one of its embodiments. Thereby, an evaluating result assigned to a device, indicating a positive inspection and/or test result, indicates that the device has positively passed the inspection and/or the test.

The present invention is further directed upon an inline device inspecting and/or testing apparatus. So as to fulfill the object as outlined above such apparatus comprises according to the present invention At least one monitoring unit adapted to be releasably applied to or over one of the devices and, in a standalone operating mode, to collect information from and/or caused by the device, whereby the monitoring unit is in standalone operating mode during a standalone timespan;

an applicator unit which is adapted to apply the monitoring unit to or over one of the devices;

a removal unit which is adapted to remove the monitoring unit from such device, after an application timespan, initiated as the monitoring unit is applied to or over the device;

a conveyor, which is adapted to inline convey the devices towards and into alignment with the applicator unit;

an arrangement, which is adapted to bring the monitoring unit from the removal unit to the applicator unit;

a reception unit which is stationary with respect to the addressed conveyor and which is adapted to receive information dependent from information collected in the monitoring unit;

a remote unit which is stationary with respect to the addressed conveyor and with an input which is operationally connected to an output of the reception unit;

control means, which are adapted to control the monitoring unit so as to collect the information during a collecting timespan.

The standalone timespan thereby includes at least a part of the application timespan;

the collecting timespan is controlled by the control means to include at least a part of the addressed part of the application timespan.

In an embodiment of the apparatus according to the invention, which may be combined with any embodiment still to be addressed, the apparatus comprises a conveyor adapted to inline convey devices including a device with the monitoring unit applied thereon or thereover from the applicator unit towards and into alignment with the removal unit.

In one embodiment of the apparatus according to the invention, which may be combined with any embodiment preaddressed and still to be addressed, unless in contradiction, the applicator unit and the removal unit are at least substantially provided at the same locus or are mutually remote. If applicator unit and removal unit are provided at the same locus, this means that a monitoring unit is applied to a device and removed from a device at the same locus. Between the applicator unit and the removal unit there may be a conveying loop of an extent as desired for the device with the monitoring unit applied thereto, along which the application timespan may be selected as desired. On the other hand the monitoring unit may be applied to a device kept stationary and the monitoring unit is removed from such device still kept stationary, i.e. application and removal of the monitoring unit is performed during the device being stationary.

If the applicator unit and the removal unit are mutually remote, then there is provided a conveying path from the applicator unit to the removal unit for the device with the monitoring unit applied thereto and by means of the length and/or average speed of conveying the application timespan can be tailored as desired.

In an embodiment of the apparatus according to the invention, which may be combined with any embodiment of the apparatus as was addressed and still to be addressed, unless in contradiction, the applicator unit and the removal unit are provided at the same locus and the apparatus comprises a stationary support station for at least one device at the addressed locus. This is, as was already addressed, the case when the device shall be loaded with a monitoring unit and the monitoring unit shall be removed from the device as the device is kept stationary.

In a further embodiment of the apparatus according to the invention, which may be combined with any preaddressed embodiment of such apparatus and with any embodiment thereof still to be addressed, unless in contradiction, the apparatus comprises a stationary support station for at least one device along a conveying path from the applicator unit to the removal unit.

In this embodiment, although the device with the monitoring unit applied thereto being conveyed from the applicator unit to the removal unit, being located at the same locus or mutually remote, there is provided along such conveying path a stationary support station which may be said a retarder station for the device, which means that along the addressed path the device with the monitoring unit applied thereto or thereover is kept in a stationary waiting position. Thereby, the extent of the application timespan may be extended as desired by such retardation without necessitating changing the length of the conveying path from the applicator unit to the removal unit and/or without changing the speed of conveying between the addressed two units.

In one embodiment of the apparatus according to the present invention, which may be combined with any embodiment already addressed and still to be addressed below, unless in contradiction, the collecting timespan is controlled by the control means to start before, with or after starting of the application timespan.

In a further embodiment of the apparatus according to the present invention, which may be combined with any preaddressed embodiment and with any embodiment still to be addressed, unless in contradiction, the collecting timespan is controlled by the control means to start before, with or after starting of the standalone timespan.

In a further embodiment of the apparatus according to the present invention, which may be combined with any preaddressed embodiment and with any embodiment still to be addressed, unless in contradiction, the monitoring unit is in standalone operating mode ongoingly during looping from the applicator unit to the removal unit and back to the applicator unit.

Still in a further embodiment of the apparatus according to the present invention, which may be combined with any preaddressed embodiment and with any embodiment still to be addressed, unless in contradiction, the monitoring unit is in the standalone operating mode at the latest at the start of the application timespan.

Still in a further embodiment of the apparatus according to the present invention, which may be combined with any preaddressed embodiment and with any embodiment still to be addressed, unless in contradiction, the control means control the collecting timespan to end before, with or after removing the monitoring unit from the device by the removal unit.

Still in a further embodiment of the apparatus according to the present invention, which may be combined with any preaddressed embodiment and with any embodiment still to be addressed, unless in contradiction, the collecting timespan is controlled by the control means to end before, with or after the end of the standalone timespan.

Still in a further embodiment of the apparatus according to the present invention, which may be combined with any preaddressed embodiment and with any embodiment still to be addressed, unless in contradiction, the standalone timespan ends before or after reception of the information by the reception unit.

Still in a further embodiment of the apparatus according to the present invention, which may be combined with any preaddressed embodiment and with any embodiment still to be addressed, unless in contradiction, the monitoring unit comprises means which are adapted to collect and hold information representing at least one of gas pressure, a gas pressure course, an amount of a gas species in a gas, a course of such an amount, a temperature, a temperature course, on optical characteristic in the visible and/or invisible light spectrum, a course of such optical characteristic, a reaction upon a radiation, a course of such reaction, electric impedance, a course of such impedance, a force, a course of such force.

Still in a further embodiment of the apparatus according to the present invention, which may be combined with any preaddressed embodiment and with any embodiment still to be addressed, unless in contradiction, the monitoring unit comprises means which are adapted to collect and hold information representing an amount of a predetermined gas species in a gas surrounding the device. The means adapted to collect and hold the information in the monitoring unit comprise a sample compartment in the monitoring unit and the remote unit is adapted for gas analysis. The reception unit comprises an input gas flow line which is adapted to be controllably connected to the sample compartment.

Still in a further embodiment of the apparatus according to the present invention, which may be combined with any preaddressed embodiment and with any embodiment still to be addressed, unless in contradiction, the monitoring unit comprises a gas pressure sensor arrangement.

Still in a further embodiment of the just addressed embodiment the addressed device is a close container and the monitoring unit is adapted to be applied over such device. The monitoring unit defines together with the addressed device a sealed interspace between the close container and the monitoring unit. The pressure sensor arrangement is in operational connection with the addressed interspace.

Still in a further embodiment of the just addressed embodiment the apparatus further comprises means which are adapted to rise pressure in the interspace above or to reduce such pressure in the interspace below a pressure which prevails in the close container one of before and of during the standalone timespan.

Still in a further embodiment of the apparatus according to the present invention, in which the monitoring unit comprises a gas pressure sensor arrangement, the device is an open container. The monitoring unit is adapted to sealingly apply the pressure sensor arrangement in a sealed flow communication with the inside of the open container and further comprises means which are adapted to establish a pressure difference between the inside of the container and the surrounding of the container, once the sealed flow communication is established.

Still in a further embodiment of the apparatus according to the present invention, which may be combined with any preaddressed embodiment and with any embodiment still to be addressed, unless in contradiction, the monitoring unit comprises an electrical power supply unit, which is adapted to electrically supply the monitoring unit at least during the standalone timespan.

In an embodiment of the just addressed embodiment of the apparatus according to the present invention the electric power supply unit is wirelessly chargeable as by inductive charging.

In an embodiment of the apparatus according to the invention, which may be combined with any of the preaddressed embodiments and embodiments still to be addressed, if not in contradiction, the control means are adapted to control the monitoring unit to collect information as the monitoring unit is adjacent to the reception unit. Thereby, information dependent from the information sample as collected is transmitted to the reception unit without intermediate storage in the monitoring unit.

In an embodiment of the just addressed embodiment more than one of the addressed reception units are provided at distinct loci along the path of the monitoring unit from the applicator unit over removal unit and back to the application unit and the control means are adapted to control the monitoring unit so as to collect the information as the monitoring unit is adjacent to respective ones of the reception units. Thereby, multiple information samples are collected and information dependent therefrom is directly, i.e. substantially without intermediate storage in the monitoring unit, transmitted to the respective reception unit. In an embodiment in which the monitoring unit collects information just when it is adjacent to a reception unit, the monitoring unit is in standalone operating mode during such a collecting and transmitting.

In an embodiment of the apparatus according to the invention, which may be combined with any embodiment already addressed and still to be addressed, unless in contradiction, the monitoring unit comprises holding means for information dependent from information as collected. If we speak of information dependent from information we understand that the information which is dependent may be equal to the information wherefrom it is dependent or may be different as e.g. prefiltered, preselected, etc.

Thereby and due to such holding means the moment of collecting information by the monitoring unit and of transmitting information dependent from such information collected may be selected independent from each other, i.e. the moment of transmitting such information to the reception unit may be selected e.g. much later than the moment at which such information was collected by the monitoring unit.

E.g. the information may be collected by the monitoring unit as it is in the standalone operating mode, whereas transmission of the information dependent from the information as collected may be performed as the monitoring unit is operated in wire-bound operating mode and/or is already separate from the respective device, i.e. after having passed the removal unit.

In one embodiment of the apparatus according to the invention, which may be combined with any preaddressed embodiment of such apparatus and embodiment thereof still to be addressed, the apparatus comprises an evaluation unit, whereby at least one of in the monitoring and in the remote unit the evaluation unit being operationally connected or connectable to collecting means in the monitoring unit. Thereby, evaluation of information as collected by the monitoring unit may be performed either by a respective evaluation unit in the monitoring unit or a respective evaluation unit in the remote unit or a part of such evaluation may be performed by an evaluation unit in the monitoring unit and the other part by an evaluation unit in the remote unit.

In an embodiment of the apparatus according to the present invention, which may be combined with any preaddressed embodiment and embodiment still to be addressed, unless in contradiction, the monitoring unit comprises an electronic data storage for holding the information as collected in the monitoring unit.

In an embodiment of the apparatus according to the present invention, which may be combined with any preaddressed embodiment thereof and embodiment still to be addressed, unless in contradiction, the monitoring unit comprises a wireless transmission unit and the reception unit comprises a wireless receiver unit. Both, reception unit and transmission unit may be bidirectional.

In an embodiment of the just addressed embodiment the monitoring unit comprises an electronic data storage for holding the information as collected, an input of the wireless transmission unit at the monitoring unit being operationally connected to an output of the electronic data storage.

Thereby, it has to be noted that we understand under the term "reception unit" generically a unit which is adapted to receive a physical signal e.g. a gas flow, a temperature, etc., whereas we understand under a wireless receiver unit and in analogy by a wireless transmission unit respective units which are adapted to transmit and respectively receive signals in the form of electromagnetic signals transmitted over air or of optical signals and are thus in fact transmitted in a contactless manner.

Still in a further embodiment of the apparatus according to the present invention, which may be combined with any preaddressed embodiment and with any embodiment still to be addressed, unless in contradiction, the apparatus comprises multiple of the addressed monitoring units. The applicator unit is adapted to apply preferably subsequently to subsequent of the devices as inline conveyed towards and into alignment with the applicator unit a monitoring unit. The removal unit is thereby adapted to remove, preferably subsequently, a monitoring unit from the devices as, for instance, inline conveyed towards and into alignment with the removal unit.

Still in a further embodiment of the apparatus according to the present invention, which may be combined with any of the preaddressed embodiments and with any of the embodiments still to be addressed, unless in contradiction, the apparatus comprises multiple of the monitoring units and the applicator unit is adapted to apply, preferably subsequently, to all subsequent of the devices as inline conveyed towards and into alignment with the applicator unit a monitoring unit. The removal unit is adapted to remove, preferably subsequently, a monitoring unit from each of the devices preferably as inline conveyed towards and into alignment with the removal unit.

Still in a further embodiment of the apparatus according to the present invention, which may be combined with any preaddressed embodiment and with any embodiment of the apparatus still to be addressed, unless in contradiction, an evaluation unit is provided, and an output of the evaluation unit is operationally connectable to a resettable storage in the monitoring unit.

Still in a further embodiment of the apparatus according to the present invention, which may be combined with any of the preaddressed embodiments, unless in contradiction, a conveyor which is adapted to inline convey the devices including a device with the monitoring unit applied thereon or thereover from the applicator unit towards and into alignment with the removal unit during the application timespan comprises at least one band conveyor.

The invention shall now further be exemplified with the help of the following figures and of even more detailed description.

Figure 1:
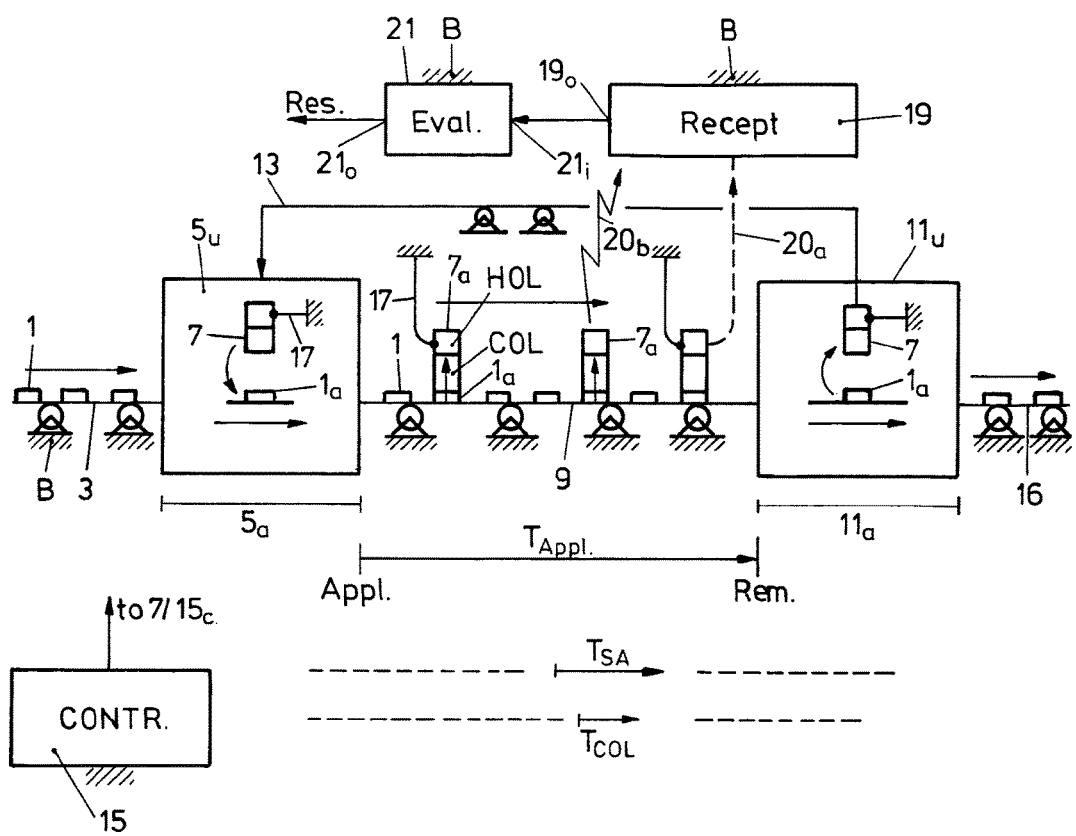
FIG. 1 schematically and simplified, by means of a functional block/signal flow diagram, an embodiment of the apparatus according to the present invention operating the methods according to the invention.

Schematically and simplified, three examples of handling the devices with applied monitoring units during the application timespan $T_{Appl.}$ as of FIG. 1.

Figure 5:
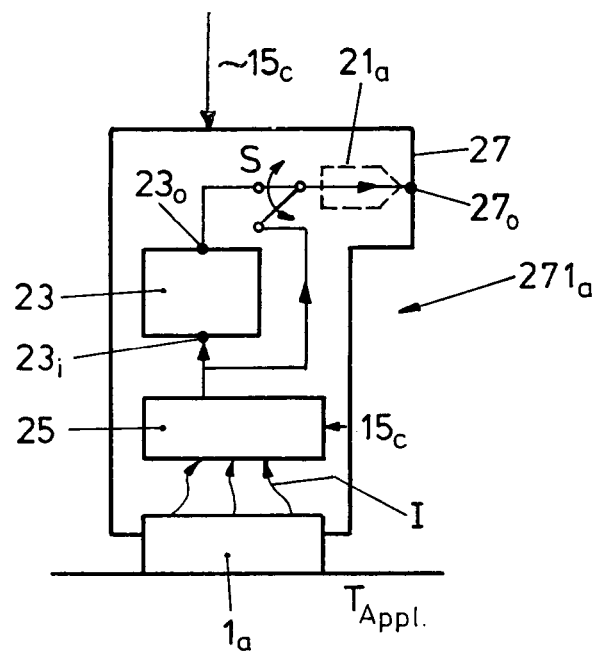
Figure 6:
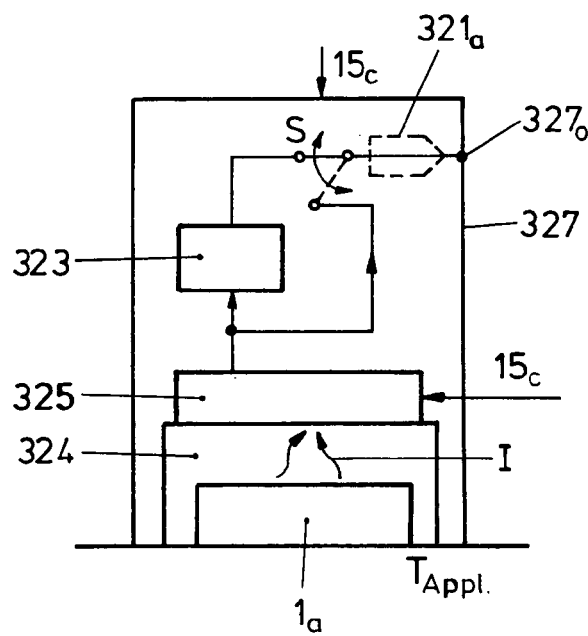
Figure 7:
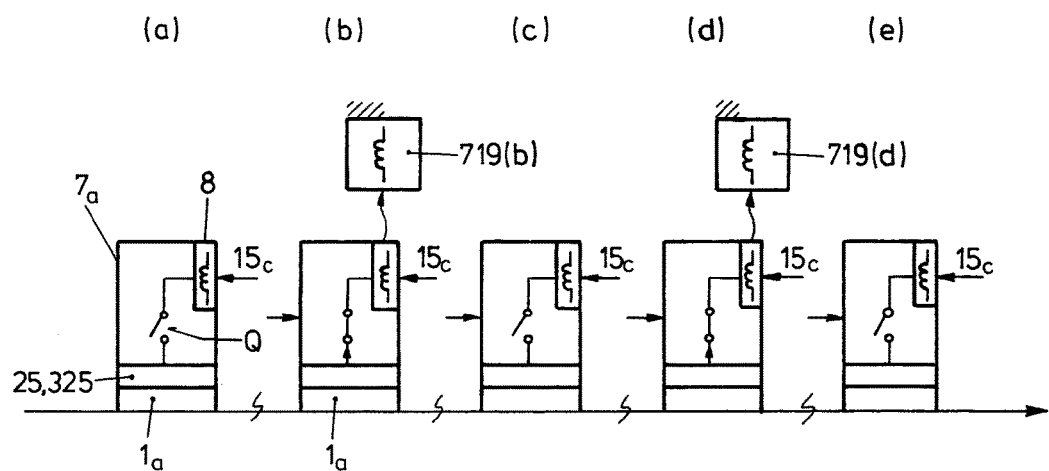
Figure 8:
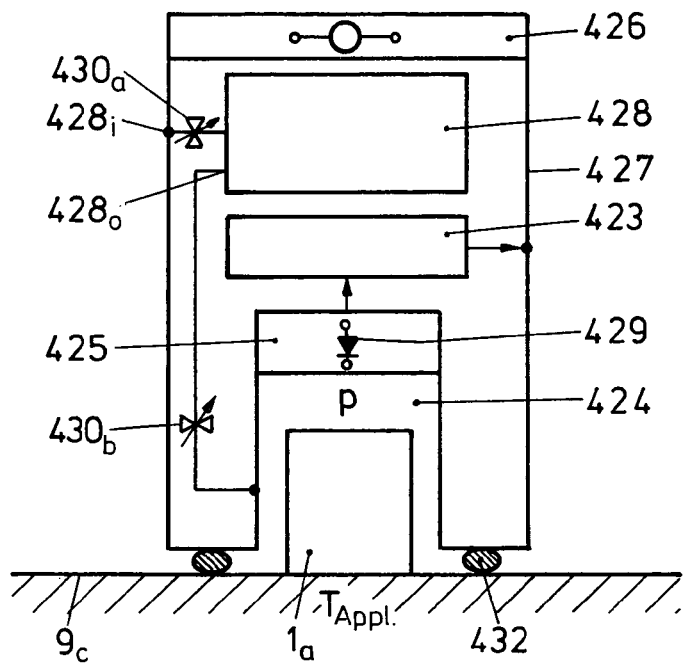
Figure 9:
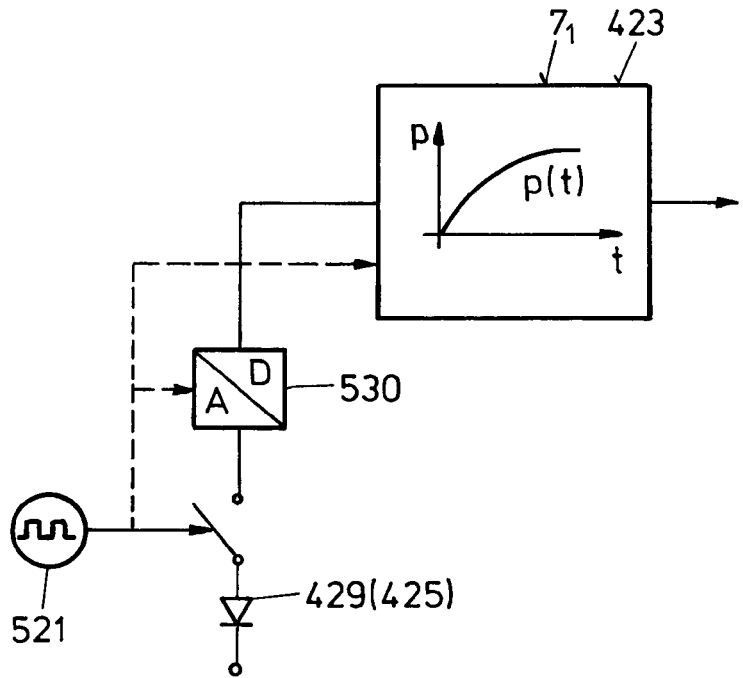
Figure 10:
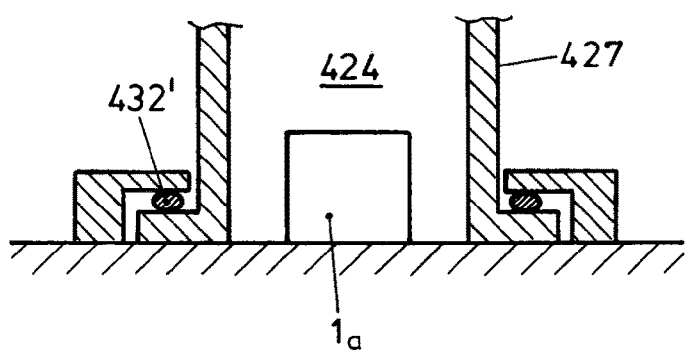
Figure 11:
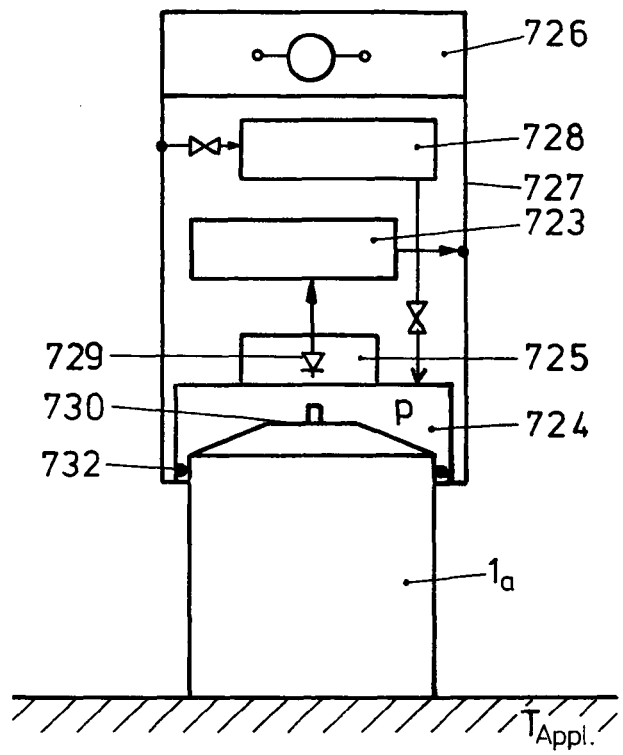
Figure 12:
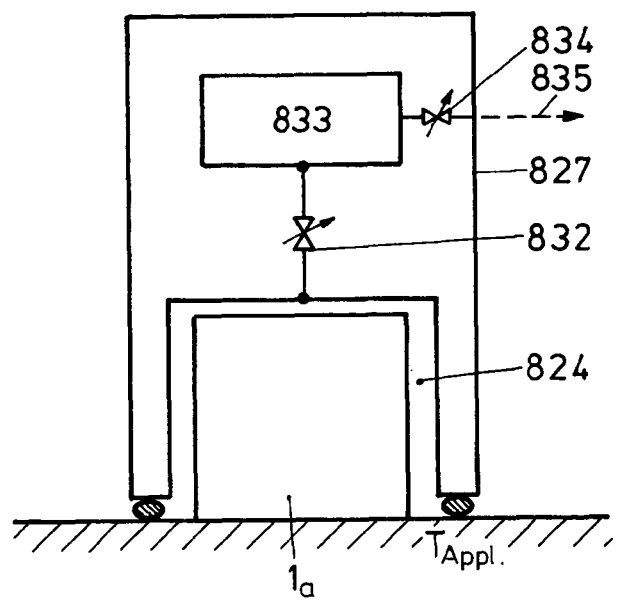
Figure 13:
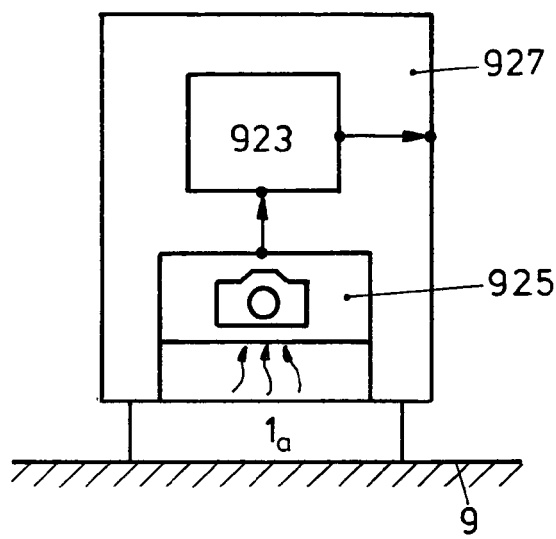
Figure 14:
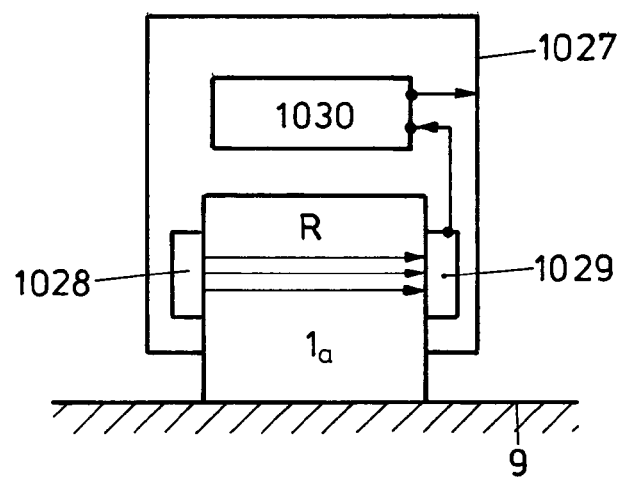
Figure 15:
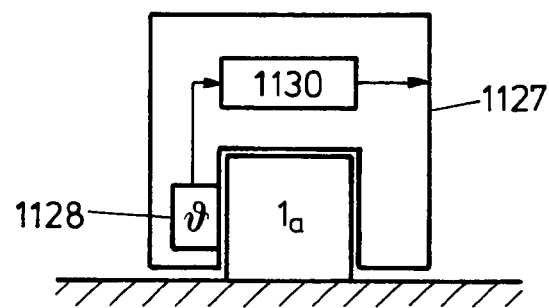
Figure 16:
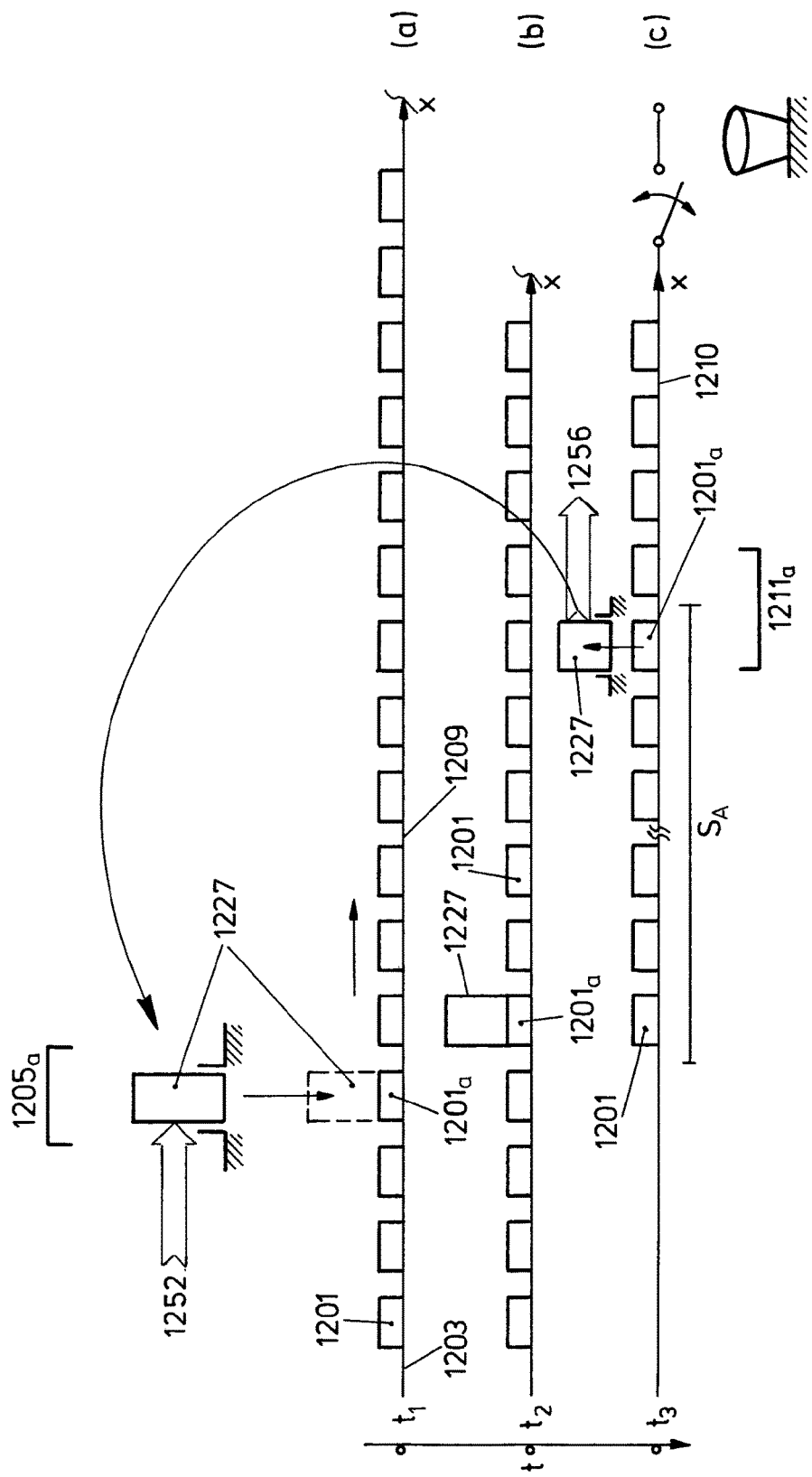
Figure 17:
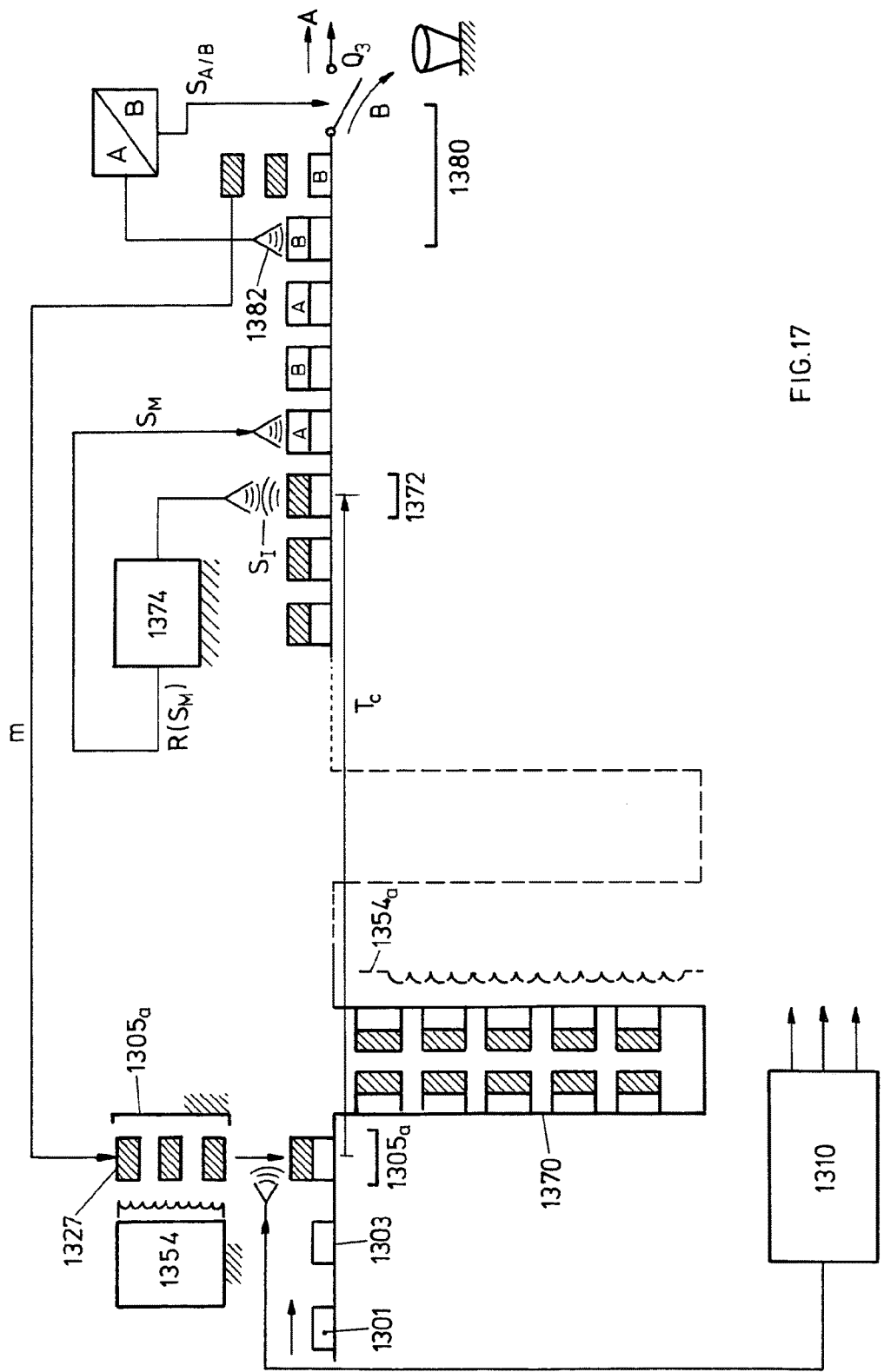
Figure 18:
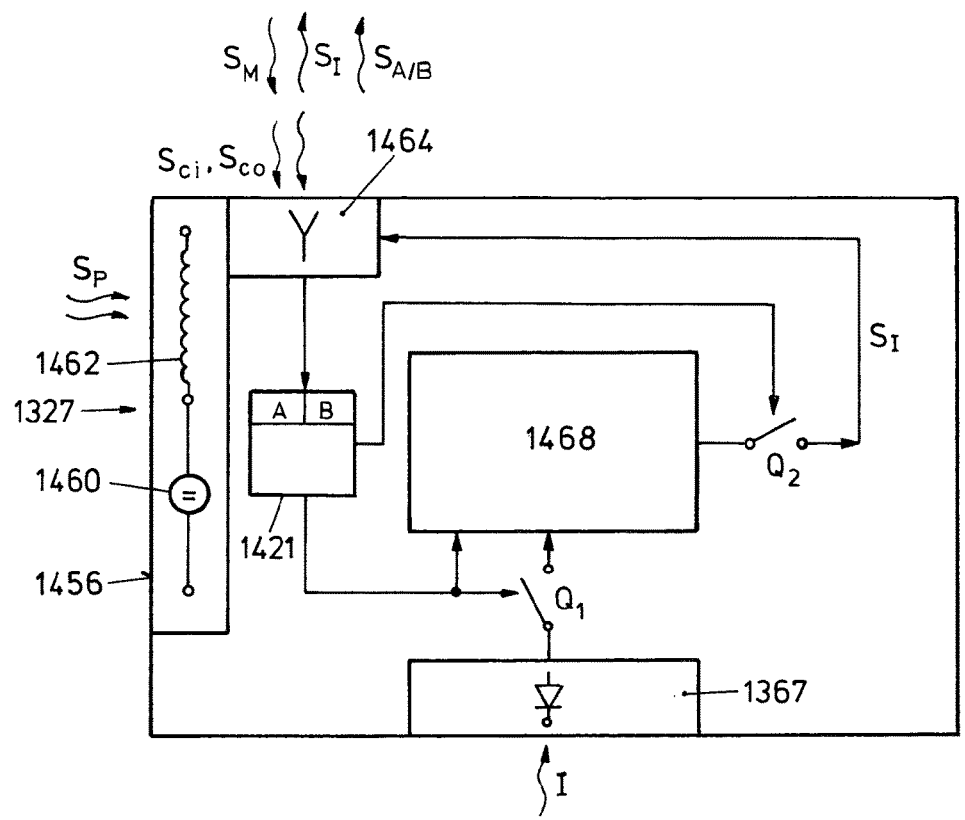
Figure 19:
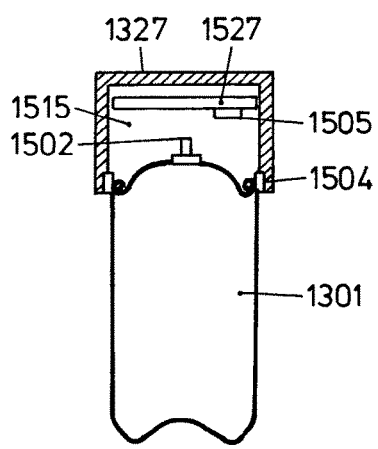
Figure 20:
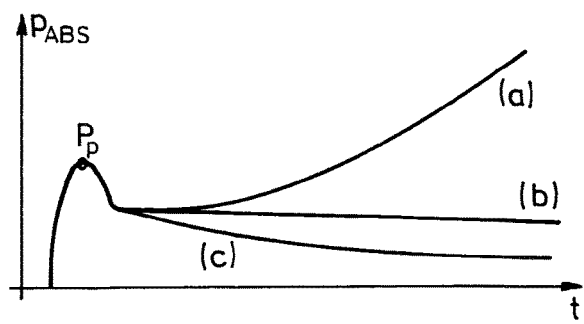

FIG. 5 simplified and schematically, a first embodiment of a monitoring unit cooperating with the device to be inspected and/or tested and as may be realized in the frame of the present invention;

FIG. 6 in a representation in analogy to that of FIG. 5, a further embodiment of a monitoring unit cooperating with a device to be inspected and/or tested and as may be realized in the frame of the present invention;

FIG. 7 schematically and simplified, synchronization of collecting information and of transmitting information from the monitoring unit in one embodiment as addressed in context with FIGS. 5 and 6;

FIG. 8 a further embodiment of a monitoring unit in a representation in analogy to those of the FIGS. 5 and 6, cooperating with the device to be inspected and/or tested and as may be realized in the frame of the present invention;

FIG. 9 simplified and schematically, a functional block/signal flow diagram of an example of monitoring within a monitoring unit as realized in the frame of the present invention;

FIG. 10 schematically and simplified, a variant of sealingly applying a monitoring unit over a device to be inspected and/or tested and as may be realized in the frame of the present invention;

FIG. 11 a further embodiment of a monitoring unit in a representation in analogy to those of the FIGS. 5, 6, 8 and cooperating with an aerosol can as a device to be inspected and/or tested and as may be realized in the frame of the present invention;

FIG. 12 a further embodiment of a monitoring unit in a representation in analogy to those of the FIGS. 5, 6, 8, 11, and its cooperation with a device to be tested and/or inspected;

FIGS. 13 to 15 still in representation in analogy to those of the FIGS. 5, 6, 8, 11, 12, further embodiments of monitoring units cooperating with devices to be inspected and/or tested and as may be realized in the frame of the present invention;

FIG. 16 in a simplified and schematic representation, an embodiment of an apparatus according to the present invention, operating methods according to the invention in three time phases (a), then (b), then (c);

FIG. 17 in a simplified and schematic representation, an apparatus according to the present invention and operating the methods of the invention and as today realized;

FIG. 18 simplified and schematically by means of a signal flow/functional block diagram, a monitoring unit as applied today to the apparatus and methods as of FIG. 17;

FIG. 19 simplified and schematically, an embodiment in more details of a monitoring unit cooperating with an aerosol can to be inspected and/or tested and as realized e.g. in the embodiment as of FIGS. 17 and 18, and FIG. 20 over the time axis, three different pressure courses as are collected for testing and/or inspection purposes e.g. by the embodiment of FIGS. 17 to 19.

DETAILED DESCRIPTION

FIG. 1 schematically shows, by means of a signal flow/functional block diagram, an embodiment of the apparatus according to the present invention and thereby of the methods according to the invention.

Devices 1 to be inspected and/or to be tested are inline conveyed by means of a conveyor 3 towards and into an application area 5a of an applicator unit $5_u$. With respect to the applicator unit $5_u$ conveyor 3 conveys subsequently devices 1 into alignment with the applicator unit $5_u$.

The conveyor 3 may be a star conveyor, a band conveyor or may comprise a combination of star and band conveyors or of any other type of known conveyors for inline conveying the devices 1.

By the applicator unit $5_u$ and thus in the application area $5_a$ there is applied a monitoring unit 7 on or over at least one of the devices $1_a$ out of the devices 1 inline conveyed by conveyor 3. The devices 1 including device $1_a$ whereon or whereover a monitoring unit 7 is applied are conveyed by a conveyor 9 out of the application area $5_a$ towards and into a removal area $11_a$ of a removal unit $11_u$. With respect to the removal unit $11_u$ conveyor 9 conveys subsequently the devices 1 into alignment with such removal unit $11_u$. By means of the removal unit $11_u$ the respective monitoring unit 7 is removed from device $1_a$, whereon or whereover it was formerly applied.

The conveyor 9 may comprise any type of known conveyor as one or more star conveyors, but comprises in a good embodiment one or more than one band conveyors as will be addressed later.

The monitoring unit 7 as removed by removal unit $11_u$ and, respectively, in the removal area $11_a$ is conveyed back into the application area $5_a$ and thus to the applicator unit $5_u$ as schematically shown in FIG. 1 by means of conveyor 13.

The overall method and thus apparatus is controlled and timed by means of a control unit 15 and thereby especially and as addressed in FIG. 1 the one or more than one monitoring units 7.

The monitoring unit 7 is adapted on one hand to be releasably applied to or over one of the devices 1 as was already addressed and additionally to collect and possibly hold information from and/or caused by the device $1_a$ to which it is applied. Different examples of collecting and possibly of holding such information by monitoring unit 7 will be addressed later. In FIG. 1, generically, information collecting is represented by the arrows COL and holding is represented by a holding unit HOL in the respective monitoring units 7.

The monitoring unit 7 is operated in a standalone operating mode at least during a part of the time from applicator unit $5_u$ to removal unit $11_u$. Please note that parts and units which are stationary with respect to the movement of the conveyors 3, 9 and 13 are represented in FIG. 1 by dash lines as at B. Further please note that the monitoring unit $7_a$ in FIG. 1 is operated in standalone mode as any wire-bound connection for energy transfer schematically represented in FIG. 1 at 17, has been removed.

As further shown in FIG. 1 conveying the devices 1 and therewith also devices $1_a$ with a monitoring unit 7 applied thereon or thereover by means of conveyor 9 from application area $5_a$ and thus from the applicator $5_u$ towards and into removal area $11_a$ and thus in alignment with removal unit $11_u$ occurs during a timespan $T_{Appl.}$. As schematically shown by means of monitoring unit $7_a$, during at least a part of the timespan $T_{Appl.}$ the monitoring unit 7 is operated in the standalone operating mode as shown in FIG. 1 by the timespan $T_{SA}$. This timespan $T_{SA}$ may extend as desired and may e.g. include removal of the monitoring unit 7 from device $1_a$. The addressed timespan $T_{SA}$ may also e.g. begin with the start of $T_{Appl.}$ or even before, thus extending further to include application of the monitoring unit 7 to the respective device $1_a$ in the application area $5_a$ and thus by the applicator unit $5_u$.

The monitoring unit 7 is adapted to collect and possibly hold information from a respective device or caused by a respective device it is applied to. The monitoring unit 7 is controlled by controller unit 15 to initiate and terminate a timespan $T_{COL}$ during which the addressed information is collected COL by the monitoring unit, which collected information is possibly held HOL in the monitoring unit 7. The timespan during which such collecting is performed by the monitoring unit 7 is addressed in FIG. 1 by $T_{COL}$. In any case at least a part of the addressed timespan $T_{COL}$ is within a part of the standalone timespan $T_{SA}$, which latter part is within the application timespan $T_{Appl.}$ as shown in FIG. 1. Nevertheless, the addressed collecting timespan $T_{COL}$ may be extended as shown in dash line in FIG. 1.

The monitoring unit 7 has an output by which information, possibly held in the monitoring unit as at HOL, is transmitted to a reception unit 19, which is, as shown by B, stationary with respect to conveyors 3, 9 and 13. The transmission of the information from monitoring unit 7 may be performed as shown in dash line at 20$_a$ wire-bound, if such transmission is performed outside the standalone timespan $T_{SA}$. In a good embodiment at least a part of this transmission is performed within the standalone timespan $T_{SA}$ as shown by wireless transmission at 20$_b$. In this case the monitoring unit 7 comprises a wireless transmission unit, whereas the reception unit 19 comprises a wireless receiver unit (not shown in FIG. 1). The reception unit 19 has an output 19$_o$ which is operationally connected to an input 21$_i$ of an evaluation unit 21. Evaluation unit outputs at an output 21$_o$ the result of inspection and/or testing of the respective device 1$_a$. In dependency of such result it is selected how the respective device is further processed downstream the removal area 11$_a$ i.e. downstream the removal unit 11$_u$.

Figure 2:
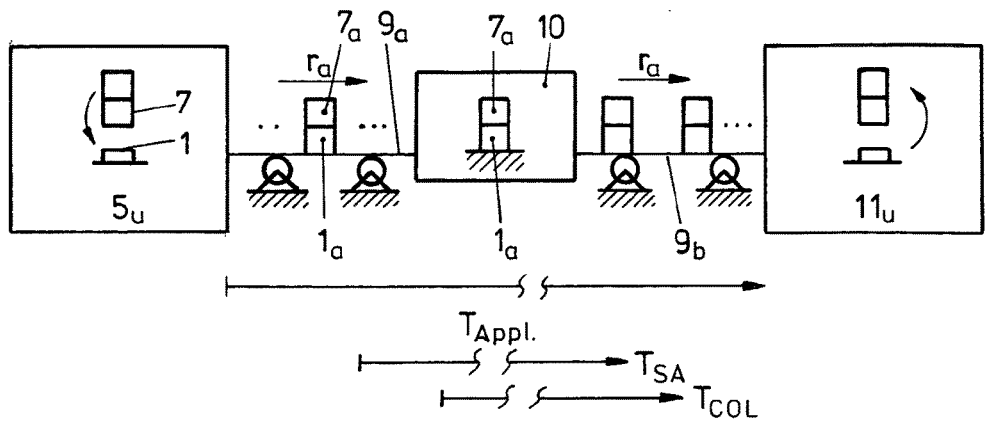
FIGS. 2 to 4
Figure 3:
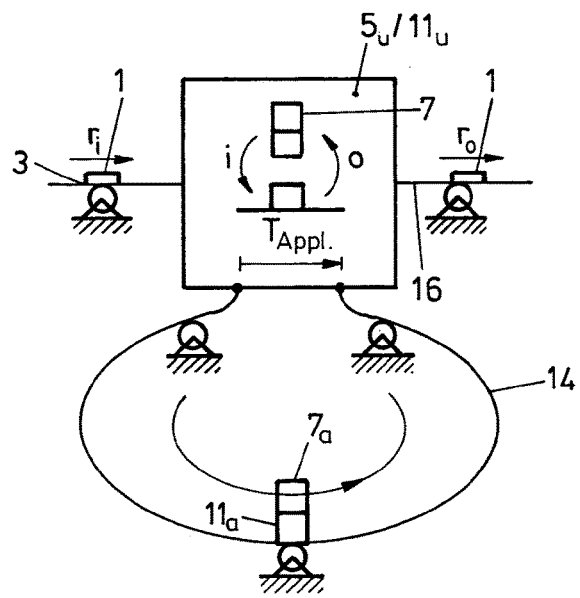
Figure 4:
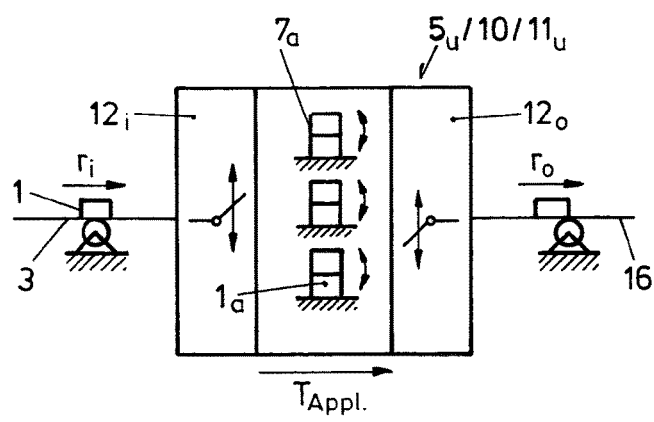

Handling of the devices 1 and especially the devices 1$_a$ whereat or wherever a monitoring unit 7$_a$ is applied during the application timespan $T_{Appl.}$ as of FIG. 1 shall be addressed in context with the FIGS. 2 to 4. According to FIG. 2 in the application unit 5$_u$ a monitoring unit 7 is applied to a device 1 as was addressed in context with FIG. 1. The device 1$_a$ with the applied monitoring unit 7$_a$ is conveyed, possibly together with devices 1 without monitoring unit, by means of a conveyor 9$_a$ at a rate $r_a$ of subsequent devices 1/1$_a$ towards and into a retarder unit 10. In the retarder unit 10 the conveying rate or speed at least for devices 1$_a$ with monitoring units 7$_a$ applied thereto is lower than the input rate $r_a$, along a predetermined conveying path or is even lowered to zero, which means that in this case and within retarder unit 10, the devices 1$_a$ with the monitoring unit 7$_a$ applied thereto come to a complete standstill and are thus stationary. Downstream the retarder unit 10 the devices 1$_a$ still with the monitoring unit 7$_a$ applied thereto are conveyed out of the retarder unit 10 towards and into the removal unit 11$_u$ according to FIG. 1. Thus, by the retarder unit 10 the overall application timespan $T_{Appl.}$ may be tailored flexibly and as desired and especially lengthened without necessitating long conveying paths as would be the case if the devices 1$_a$ with the monitoring unit 7$_a$ applied thereto were conveyed between the applicator unit 5$_u$ to the removal unit 11$_u$ at constant speed.

As further shown in FIG. 2 and with respect to the application timespan $T_{Appl.}$ the standalone timespan $T_{SA}$ preferably includes the timespan during which the devices 1$_a$ with the respective monitoring unit 7$_a$ are present within the retarder unit 10 and the collecting timespan $T_{COL}$, preferably includes that part of the timespan $T_{SA}$. Preferably the timespans $T_{SA}$ and $T_{COL}$ include the timespan the devices and monitoring units stay in retarder unit 10.

Thereby the timespan during which the devices with the monitoring unit applied thereto are present in the retarder unit 10 is exploited especially to collect information by the respective monitoring units 7$_a$ as more such information is required. As was addressed, downstream the retarder unit 10 the combined devices/monitoring units 1$_a$/7$_a$ are conveyed with the input rate $r_a$ as by a conveyor 9$_b$.

According to FIG. 3 the devices 1 are conveyed into a combined application/removal unit 5$_u$/11$_u$ located at least substantially at the same locus in the overall apparatus. The arriving workpieces 1 are loaded as schematically shown with the arrow i with a monitoring unit 7 and leave the combined applicator/removal unit 5$_u$/11$_u$ on a conveyor loop of desired length and desired conveying speed and are brought back to the combined applicator/removal unit 5$_u$/11$_u$ where the respective monitoring units 7 are removed from the devices as shown by the arrow o in FIG. 3. Downstream the combined applicator/removal unit 5$_u$/11$_u$ the devices 1 are removed with a conveying rate $r_o$ equal to the input conveying rate $r_i$ to the applicator/removal unit 5$_u$/11$_u$.

With respect to the timespans $T_{Appl.}$, $T_{SA}$ and $T_{COL}$ the same prevails as was already addressed in context with FIG. 1 and FIG. 2.

In the embodiment of FIG. 4 the devices 1 are conveyed by conveyor 3 according to FIG. 1 with an input rate $r_i$ to an applicator/retarder/removal unit 5$_u$/10/11$_u$. The retarder effect is here realized by keeping the devices 1$_a$ with the respective monitoring units 7$_a$ applied thereto stationary during the application timespan $T_{Appl.}$. Thus, the devices 1 fed to the unit 5$_u$/10/11$_u$ are distributed as schematically shown by a distribution unit 12$_i$ to different positions, where the respective monitoring units 7 are applied to the devices 1 kept stationary. After lapse of the desired application timespan $T_{Appl.}$ the respective monitoring units 7$_a$ are removed from the addressed devices still stationary and the devices 1 are then redistributed by output redistributing unit 12$_o$ onto the output conveyor 16 with an output rate $r_o$ equal to the input rate $r_i$.

FIG. 5 and FIG. 6 most schematically show two embodiments of a monitoring unit under a most generic aspect. A device 1$_a$ shall be tested and/or inspected. Although testing may include inspecting and vice versa, we rather understand under inspecting optical picture inspection, whereas we understand under testing taking some kind of measurements upon the device.

According to the embodiment of FIG. 5 the monitoring unit 27 is constructed to be releasably applied to or over device 1$_a$ to be inspected and/or tested during the application timespan $T_{Appl.}$. The monitoring unit 27 is thereby applied to the device 1$_a$ to form therewith a unit 271$_a$ which may be moved as one piece. The monitoring unit 27 is adapted to collect information I from device 1$_a$ or information which is caused by the device 1$_a$. As an example such information I may be an optical appearance of device 1$_a$. In such a case the addressed information I is information from such device. On the other hand such information I may be present in the surrounding of the device 1$_a$ as e.g. a gas pressure value or a gas species; such information I is caused by the device.

The monitoring unit 27 collects such information I as schematically shown in FIG. 5 by a collecting unit 25 and holds such information in a holding unit 23. The holding unit 23 is adapted to allow transmission of information as held therein from its output 23$_o$ to the exterior of the monitoring unit 27 as schematically shown at an output 27$_o$. The holding unit 23 is operationally connected to the collecting unit 25 as shown at the input 23$_i$ of holding unit 23.

According to the embodiment of FIG. 5 the monitoring unit 27 is releasably applied on the device 1$_a$ to be inspected and/or tested.

The difference of the embodiment of the monitoring unit 327 as schematically shown in FIG. 6 to that, 27, of FIG. 5 is that according to FIG. 6 such monitoring unit 327 is releasably applied over the device 1$_a$, e.g. residing on conveyor 9 as of FIG. 1. In a good embodiment an interspace 324 is thereby defined between the device 1$_a$ and the monitoring unit 327.

As further shown in FIG. 5 as well as in FIG. 6 the output of collecting unit 25/325 may directly be fed to the output 27$_o$/327$_o$ of the monitoring unit 27/327. In this case the collected information is transmitted to the reception unit 19 as of FIG. 1 substantially at the same time as the information I is collected by the collecting unit 25/325. Thus, the control unit 15 as of FIG. 1 controls in this case collecting of information I at the monitoring unit 27/327 at a moment, at which transmission from the output $27_o/327_o$ to the reception unit 19 is possible, i.e. at a moment at which at least a part of the reception unit 19 is located adjacent to the momentary position of the monitoring unit 27/327 and of the respective device $1_a$. Collecting information I is initiated by the control unit 15 when the monitoring unit 27/327 and the respective device $1_a$ are adjacent to that part of the reception unit 19. In FIGS. 5, 6 the control input $15_C$ indicates the operational control connection of the monitoring unit 27/327 to the control unit 15 as of FIG. 1.

As schematically shown in FIGS. 5, 6 by switch S it is absolutely possible to hold a part of the collected information I in the holding unit 23/323 and to directly lead information from collecting unit 25/325 to the output $27_o/327_o$ e.g. controlled by the control unit 15. Thus, at a monitoring unit 27/327 considered, either all information I collected is held in a holding unit 23/323 and then transmitted via output $27_o/327_o$ or information I collected by the collecting unit 25/325 is directly fed to the output $27_o/327_o$ to be transmitted. Alternatively both possibilities are present in one monitoring unit 27/327 and selection of the respective possibility is e.g. controlled by control unit 15 as of FIG. 1.

In context with FIG. 1 there has been described an evaluation unit 21 operationally connected to the output of reception unit 19. As shown in FIGS. 5 and 6 by dash lines there may be provided in the monitoring unit 27/327 instead of stationary, remote evaluation unit 21 as of FIG. 1 an evaluation unit $21_d/321_a$, or there may be provided additionally to the stationary evaluation unit 21 as of FIG. 1 an evaluation unit $21_d/321_a$ in the monitoring unit 27/327. Such combined solution may e.g. exploit the evaluation unit $21_d/321_a$, in the monitoring unit 27/327 for pre-evaluation e.g. based on a plausibility test, and the evaluation unit 21 remote and stationary as final, decisive evaluation unit.

FIG. 7 shows simplified and schematically a device $1_a$ with a monitoring unit $7_a$ applied thereto. The monitoring unit $7_a$ comprises a collecting unit 25, 325 according to FIG. 5 or 6, the output thereof being directly led to a wireless transmission input/output unit 8 via a sampling switch Q controlled, as schematically shown, via a control input $15_c$ from control unit 15 as of FIG. 1 to wireless input/output unit 8. FIG. 7 shows the addressed device $1_a$ with monitoring unit $7_a$ in different positions (a) to (e) during the application timespan $T_{Appl.}$. In position (a) the sample switch Q is open. In position (b) the monitoring unit $7_a$ with the device $1_a$ is adjacent to a wireless reception unit 719(b). The sampling switch Q is closed, the information from collecting unit 25/325 is fed to the wireless transmission input/output unit 8 and received by wireless reception unit 719(b), which e.g. may be part of the reception unit 19 as of FIG. 1.

In position (c) sampling switch Q is open again as no wireless reception unit according to unit 719(b) is present adjacent to the monitoring unit in that position (c). In analogy in position (d), where a wireless receiver unit 719(d) is present, sampling switch Q is closed and reopened in position (e).

FIG. 7 thus shows an example how information is read out of the monitoring unit as no information holding or storing is performed within the monitoring unit.

At least during the collecting timespan $T_{COL}$ during which the monitoring unit 27/327 (FIG. 5, 6) collects the addressed information I, at least a part thereof being possibly held in holding unit 23/323 for later output at $27_o/327_o$, the monitoring unit 27/327 is operated in the standalone operating mode SA.

The monitoring unit as used by and within the present invention may be constructed in a large number of different variants, on one hand adapted to specific needs of inspecting and/or testing specific devices and on the other hand according to the characteristics of different devices.

A small number of examples of monitoring units shall now be presented and shortly discussed, in that variant according to FIGS. 5, 6 in which information I as collected is held or stored in the monitoring unit before performing transmission of information dependent therefrom to the stationary reception unit.

In FIG. 8 there is schematically shown a monitoring unit 427 which is adapted for a device $1_a$ to be tested by monitoring a pressure p in the sealed surrounding of the device $1_a$.

According to FIG. 8 the monitoring unit 427 is shaped to be applied over the device $1_a$, leaving between such device $1_a$ and the monitoring unit 427 an interspace 424. Within monitoring unit 427 there is provided a compartment 428 with a controlled input $428_i$ and a controlled output $428_o$ leading to the interspace 424. The collecting unit 425 comprises a pressure sensor arrangement 429 sensing pressure p in interspace 424 and being operationally connected to holding unit 423. Holding unit 423 is or comprises an electronic storage for storing a multitude of data dependent from output signals of the pressure sensor arrangement 429. As schematically shown in FIG. 9 the monitoring unit 427 may comprise an electronic clock 521 which controls sampling the output of the pressure sensor arrangement 429. Analogue to digital conversion is performed by converter unit 530. The respective sample values are stored in holding unit 423, realized by an electronic storage. A course of the pressure p over time, p(t), may be sampled and stored in holding unit 423.

According to FIG. 8 the monitoring unit 427 further comprises an electric power supply unit 426, which allows operation of all electrically supplied units in monitoring unit 427, as of controllable valves $430_a/430_b$, electronic units 521, 530, 423 etc. as of FIG. 9 and possibly also of the collecting unit 425. The electric power supply unit 426 may be a battery arrangement or is, in a good embodiment, a rechargeable battery-unit or capacitor unit. Recharging or charging the battery- or capacitor unit is performed either before initiating the standalone operating SA mode of monitoring unit 427 by a wired connection of unit 426 to a charger unit, or by charging the rechargeable battery- or capacitor-unit of power supply unit 426 by contact-free e.g. inductive charging, especially if such recharging is performed during the timespan $T_{SA}$. Charging or recharging the power supply unit may be an ongoing process especially during the standalone timespan $T_{SA}$, e.g. by means of an ongoing induction link to an extended inductive loop, and especially if the power consumption of the monitoring unit is relatively high. Nevertheless and generically, wireless charging of the power supply unit 426 may also be performed before and/or after the standalone timespan $T_{SA}$.

The compartment 428 is vacuum charged, before initiating the standalone timespan $T_{SA}$ by means of a vacuum pump (not shown) connected to input $428_i$. The monitoring unit 427 is applied over device L. From this moment the standalone timespan $T_{SA}$ may be initiated. By opening valve $430_b$ the interspace 424 is evacuated as well, to a vacuum level which is the closer to the precharged level in compartment 428 the smaller that interspace 424 is with respect to the volume of the compartment 428. By evacuating the interspace 424 the monitoring unit 427 is additionally sealingly pressed to the support 9c for device $1_a$ as schematically shown in FIG. 8 by the seal 432. If valve $430_b$ is to be opened during the standalone timespan $T_{SA}$, a control signal to the valve 430$_b$ is wirelessly transmitted to the monitoring unit 427 (not shown). Clearly it is also possible to open valve 430$_b$ before initiating the standalone timespan T$_{SA}$. Then a control signal to the valve 430$_b$ may be applied wire-bound to the monitoring unit 427.

The collecting timespan T$_{COL}$ may be initiated before or after evacuating interspace 424 dependent whether the pressure course in the interspace 424 is relevant information also during evacuation, e.g. to check on proper seal by seal 432. Irrespective whether evacuation of interspace 424 is performed before or after initiating timespan T$_{SA}$, the monitoring unit 427 is operated during at least a part of standalone timespan T$_{SA}$ subsequent to evacuation, whereby such part is selected so as to register a pressure course over time long enough to be sufficient for the intended testing. If the device 1$_a$ is a closed container to be leak tested, there will occur, if the container is leaky, a significant change of pressure p in the interspace 424, which is indicative for leakiness and which will be recognized in the subsequent evaluation of the pressure course as held in electronic storage according to holding unit 423. The pressure course is evaluated e.g. in an evaluation unit 21 as of FIG. 1 and/or an evaluation unit 21$_a$/321$_a$ as on FIGS. 5, 6, in the monitoring unit 427.

If the closed container, as the device 1$_a$, is intensively pressurized it may be possible not to vacuumize interspace 424. In this case and/or if evacuation of the interspace 424 is not necessarily performed during the standalone timespan T$_{SA}$, then the compartment 428 may be omitted. In the latter case the interspace 424 is directly vacuumized by applying a pumping line thereto before initiating the standalone timespan T$_{SA}$. Again the collecting timespan T$_{om}$ may be initiated already before or only after the start of the standalone timespan T$_{SA}$.

If the device 1$_a$ shall be tested by applying to its surrounding on overpressure with respect to its interior pressure, then the compartment 428 is pressurized and, by opening valve 430$_b$, the interspace 424 as well.

According to FIG. 10 the sealing action is then inversed and realized by sealing member 432'.

FIG. 11 shows in a schematic representation in analogy to that of FIGS. 5, 6 a monitoring unit 727 which is applied to a device 1$_a$. In analogy to the embodiment of FIG. 8 the pressure p in a surrounding volume 724 of the device 1$_a$ is monitored and held in the holding unit, realized by an electronic storage 723. In opposition to the embodiment of FIG. 8, the monitoring unit 727 of FIG. 11 performs testing only a part of device 1$_a$. The device 1$_a$ may be e.g. a aerosol can, whereat the top 730 with the spray valve output is to be tested with respect to leakiness. The monitoring unit 727 is sealingly applied upon the top of the aerosol can device 1$_a$, as schematically shown at 732. An interspace 724 between the top part 730 of aerosol can device 1$_a$ and monitoring unit 727 is formed. The pressure p in that interspace 724 is monitored by collecting unit 725, comprising a pressure sensor arrangement 729. The output of the pressure sensor arrangement 729 is operationally connected to the input of electronic storage 723.

Collecting information and holding same is performed as was explained in context with FIG. 8 e.g. by means of a technique according to FIG. 9.

The monitoring unit 727 is electrically supplied by supply unit 726 in analogy to unit 426 in FIG. 8.

Equally to the embodiment of FIG. 8, if the device 1$_a$ has an interior pressure which is larger than the surrounding pressure, there is no need to evacuate interspace 724 according to the interspace 424. If such overpressure within device 1$_a$ is not sufficient, then and as shown in FIG. 11 in analogy to FIG. 8, a compartment 728 is provided which is controllably loaded to a predetermined vacuum before the standalone timespan T$_{SA}$ and is controllably put in flow communication to interspace 724 before or after initiation of the standalone timespan T$_{SA}$. As was described in context with FIG. 8, the course p(t) of pressure p is sensed by a pressure sensor arrangement 729 of collecting unit 725 and the respective data is held in an electronic storage or holding unit 723. The monitoring unit 727 is electrically powered at least during the standalone timespan T$_{SA}$ by the power supply unit 726, a battery arrangement or a rechargeable battery- or capacitor-unit, rechargeable either contactlessly e.g. by means of induction charging or by a charging cable or wire.

For certain applications of a monitoring unit 727 as shown in FIG. 11 it might be necessary to apply overpressure in the interspace 724 with respect to the pressure inside device 1$_a$. In such a case the interspace 724 is put under overpressure, be it by overpressurizing compartment 728 or—directly—through a pressurizing line (not shown in FIG. 11), before initiating the standalone timespan T$_{SA}$.

The embodiments as shown in the FIGS. 8 to 11, which are based on collecting information about gas pressure in the surrounding of a device 1$_a$, are especially suited for leak testing containers which are closed used and possibly filled with a product. Nevertheless, it is also possible to tailor the monitoring unit 7 as of FIG. 1 for leak testing open containers. In such case the respective monitoring unit is sealingly applied to the opening of the container. The interior of the container is pressurized and the course of the pressure inside the container, after pressurizing, is monitored and the respective information held in analogy to the embodiments according to FIGS. 8 to 11.

As was addressed above and depending on the type of device to be inspected and/or tested a large variety of techniques for collecting information from and/or caused by the device are possible. In all such embodiments of monitoring units to be exploited in context with the present invention, during a predetermined collecting timespan, which includes at least a part of a timespan T$_{SA}$ during which the monitoring unit is operated in standalone operating mode, information is collected and possibly held e.g. by electronic storing within the monitoring unit for further evaluation.

Attention is drawn to the fact that if information which, generically spoken, depends from the information as collected is held or stored in the monitoring unit, transmission of information which depends from the stored information to a reception unit as of 19 of FIG. 1 may be done even after the monitoring unit has been removed from the device.

According to FIG. 12 the monitoring unit 827 is applied over the device 1$_a$, which may be a closed container which contains a pressurized gas comprising a specific gas species. The interspace 824 is, if at all necessary, evacuated either by applying the action of an external pump by means of a wire-bound pumping line to the interspace 824 or by providing, as was explained in context with the embodiment of FIG. 11, a prevacuumized compartment in analogy to compartment 728 of the embodiment of FIG. 11.

The interspace 824 is in controlled flow communication with a holding compartment 833 via a wirelessly or wire-bound controlled valve 832. If a leak is present in the closed pressurized container 1$_a$ the leak will cause gas with the addressed gas species to flow into interspace 824 and through open valve 832 also into holding compartment 833. By having the gas in the interspace 824 flown into holding compartment 833, information as caused by device 1$_a$ about its leakiness is collected within holding compartment 833. After a predetermined collecting timespan $T_{COL}$ the valve 832 is closed, be it by a control signal wirelessly transmitted to the monitoring unit 827, if such closing is to be performed during standalone timespan $T_{SA}$, or by a wire-bound control signal, if such closing is to be performed outside the standalone timespan $T_{SA}$. Thus, the collected information, namely the content of the addressed gas species in the gas in interspace 824, becomes held in the holding compartment 833.

This information is fed to an evaluation unit 21 according to FIG. 1 in that, after standalone timespan $T_{SA}$, the holding compartment 833 is brought in flow communication with the input of the evaluation unit 21, which in such case is or comprises a gas analyzer as e.g. a mass spectrometer. Establishing the addressed gas flow communication to the evaluation unit 21 is performed by opening a valve 834 in an output line of holding compartment 833. As this is performed in any case when the flow communication to the input of the evaluation unit according to 21 of FIG. 1 is established, the respective control of valve 834 is performed via a wire-bound signal transmission line (not shown in FIG. 8) to the monitoring unit 827.

In this case the reception unit as of 19 of FIG. 1 is in fact omitted or may be said to be realized by the flow communication line from the monitoring unit 827 to the evaluation unit as shown in dash line at 835 in FIG. 1.

By this technique the content of the addressed gas species in the interspace 824 is collected and transmitted to the evaluation unit according to 21 of FIG. 1 as information at one point in time, namely at that point, when valve 832 has been closed.

If it is desired to collect and hold information about the course with which the addressed gas species accumulates over time in the interspace 824, then more than one holding compartments in analogy to holding compartment 833 are provided in the monitoring unit 827 and such holding compartments are loaded subsequently in time with gas from interspace 824 by respectively and subsequently closing control valves in analogy to valve 832 to the respective holding compartment. Then each of these compartments holds information about the amount of the addressed gas species in the gas of interspace 824 at that point in time at which the respective valve to the interspace 824 was closed. Transmitting of the information held in the more than one holding compartments is performed by respective multiple flow communication lines to the evaluation unit according to 21 of FIG. 1 via respectively controlled valves in analogy to valve 834 of FIG. 12 or via a flow-line multiplexer.

The embodiment of FIG. 12 shall show that the "information" which is collected and possibly held in the monitoring unit and as exploited in and by the present invention, is to be interpreted in broad terms in that such information may be collected and possibly held in form of physical signals, as e.g. in form of gas pressure, gas species content but also as temperature values, visual appearance, reaction on radiation, impedance, force, etc.

FIG. 13 shows schematically and in a representation analogous to that of FIG. 11 or 12 a monitoring unit 927 applied to a device $1_a$. The collecting unit 925 comprises, as schematically shown with the camera-symbol, a picturing sensor arrangement by which the optical appearance of the device $1_a$ may be picture- or video-registered. This may be done according to the specific needs for inspection and/or testing and according to the respective device $1_a$ in the visual light spectrum and/or in an invisible light spectrum as in infrared light spectrum.

As was amply explained to now, the information, picture or video information as collected by the collecting unit 925, is held in holding unit 923 in analogy to holding unit 723 as of FIG. 11 which is in the case of the FIG. 13 embodiment an electronic storage unit. Clearly and not shown in FIG. 13, there is provided an electrical power supply unit as according to such unit 726 of the embodiment of FIG. 11 and control signals to the monitoring unit 927 are transmitted to that unit from the external either by wire-bound or by wireless connection, dependent whether such signals are to be applied during standalone timespan $T_{SA}$ or outside that timespan.

In the embodiment of FIG. 14 a collecting unit comprises a radiation source 1028, e.g. an X-ray source, and a radiation receiver 1029. By applying the monitoring unit 1027 to the device $1_a$ such device $1_a$ is placed between the radiation source 1028 and radiation receiver 1029 and is thus inspected or tested by collecting and holding in unit 1030 information about the reaction of device $1_a$ upon transmission of the radiation R through the respectively transparent device $1_a$.

In the embodiment as schematically shown in FIG. 15 the monitoring unit 1127 comprises as a collecting unit a temperature sensor arrangement 1128 and the collected temperature information is held—if required—in holding unit 1130, again an electronic storage.

These examples show the skilled artisan that the monitoring unit as exploited by the present invention may be constructed to suit a large range of different needs for respective inspection and/or testing of different devices.

FIG. 16(a) to (c) show simplified and schematically three status at different times $t_1$ to $t_3$ of the method according to the present invention and accordingly of an apparatus performing such method. On a conveyor 1203 devices 1201 are inline conveyed along a path towards an application area $1205_a$. In the application area $1205_a$ a monitoring unit 1227 resides in a stationary waiting position with respect to the movement of the devices 1201 on conveyor 1203. In this position the monitoring unit 1227, embodiments of which having been explained in context with the FIGS. 5 to 15 may be prepared for subsequent operation if required. Thereby, the monitoring unit 1227 may be generically wire-bound connected, 1252, as e.g. by a charging cable connecting an electric power supply in the monitoring unit 1227 to an electric charger, a pressure or vacuum line to a pressure or a vacuum source, etc. As soon as one of the devices 1201 is moved into the application area $1205_a$ the monitoring unit 1227 is released from its stationary position and is applied as shown in dashed line in FIG. 16(a) to one, $1201_a$, of the devices 1201. In a good embodiment, at least from this moment in fact initiation of the application timespan $T_{Appl.}$, the monitoring unit 1227 is operated in standalone operating mode SA. Forming a unit together with the respective device $1201_a$, the monitoring unit 1227 e.g. moves from the application area $1205_a$ on a conveyor 1209 which possibly could be a continuation of the conveyor 1203. Downstream, the combined unit of device $1201_a$ and monitoring unit 1127 is conveyed, possibly via a retarder station as 10 FIG. 2, to and into removing area $1211_a$. In this area the monitoring unit 1227 is removed from the device $1201_a$ which latter continues to be conveyed towards a destination on a conveyor 1210, which as well could be realized by the conveyor 1209. The removed monitoring unit 1227 (FIG. 16(c)) becomes now again stationary with respect to the movement of the devices 1201 and may be wire-bound connected to stationary members of the apparatus as shown by the output arrow 1256 in FIG. 16(*c*), but could also further be operated in standalone mode SA.

Nevertheless, the trajectory path along which the monitoring unit 1227 is operated in standalone operating mode SA is, as a good example shown in FIG. 16, from the application area 1205$_a$ to the removal area 1211$_a$. This means $T_{SA}$ accords with $T_{Appl.}$ The standalone timespan $T_{SA}$ starts at least substantially when the monitoring unit 1227 is released from its stationary position with respect to the inline conveyed devices 1201. The collecting timespan $T_{COL}$ may be initiated before such release, together with or after the release of the monitoring unit 1227 in application area 1205$_a$.

The collecting timespan $T_{COL}$, in any case includes at least a part of the standalone timespan $T_{SA}$ and is dependent on the extent of the application timespan $T_{Appl.}$ from the application area 1205 to the removal area 1211$_a$.

The longer that this timespan $T_{Appl.}$ is selected and thus $T_{COL}$ may be selected, the longer the monitoring unit 1227 may thus collect and possibly hold information from the device 1201$_a$ or information which is caused by the addressed device. As the collecting timespan $T_{COL}$ is limited by the application timespan $T_{Appl.}$ at least a substantial part thereof being standalone timespan $T_{SA}$, $T_{Appl.}$ is that timespan which predominantly limits the timespan $T_{COL}$. Frequently the longer that the information collecting and possibly holding timespan $T_{COL}$ is selected, the more accurate is the result of testing or inspecting. E.g. if according to the embodiment of FIG. 11, where the device 1201 according to FIG. 16 is a pressurized aerosol can to be leak tested, detection of very small leaks shall be performed, this may need a relatively long timespan $T_{COL}$ to get a significant pressure information.

$T_{Appl.}$ may flexibly be adapted to the needs with respect to $T_{COL}$. If longer collecting times $T_{COL}$ are needed, $T_{Appl.}$ is lengthened and vice versa. Thereby, the application timespan $T_{Appl.}$ is flexibly adaptable because this timespan $T_{Appl.}$ includes at least a part of the standalone timespan $T_{SA}$ in which there exists no wire-bound connection between the monitoring unit and stationary parts of the apparatus.

Therefore, in a good embodiment a conveyor or an arrangement of multiple conveyors 1209 between the application area 1205$_a$ and the removal area 1211$_a$ comprises at least one band conveyor, which conveyor type allows to adjust flexibly $T_{Appl.}$ by lengthening or shortening the at least one band conveyor, e.g. by establishing a compact, serpentine-like band-conveying path. The monitoring unit is operated along such flexibly adapted conveyor in standalone mode SA.

The collection timespan $T_{COL}$, may cease before the standalone timespan $T_{SA}$ ceases. With an eye on FIG. 16 this is the case when collecting information ceases before the monitoring unit 1227 is wire-bound connected to stationary members of the apparatus. In another variant, the collecting timespan $T_{COL}$, may be terminated after the standalone timespan $T_{SA}$ which is then the case, if there is applied a wire-bound connection to the monitoring unit and collecting information continues so as to collect information also upon the behavior during and possibly after application of the wire-bound connection. The standalone timespan $T_{SA}$ may further completely include the collecting timespan $T_{COL}$. This case is particularly interesting as it covers a good embodiment in which the monitoring unit 1227 is always operated in standalone mode SA. As shown in FIG. 16 once the monitoring unit 1227 has been removed from the device 1201$_a$ it is fed back to the application area 1205$_a$ to be reapplied to a next device 1201$_a$. In one embodiment of the invention as explained to now the monitoring unit 1227 may be wire-bound connected at the application area 1205$_a$ and in the removal area 1211$_a$. Such connection and removal of wire-bound connections to and from the monitoring unit may be rather complex in construction. If there is no need for wire-bound connections to the monitoring unit 1227, in a good embodiment, the monitoring unit 1227 is practically permanently operated in the standalone operating mode SA. All signal transmission to and from the monitoring unit is performed in wireless technique as by optical free-space transmission and/or transmission of electrical signals by wireless transmitter/receiver technique.

Thus, charging a chargeable battery- or capacitor-unit in the monitoring unit is then performed contact-free inductively as the monitoring unit passes an inductive charging station on its way. This may be done one time or multiple times or ongoingly along the overall loop, or a significant part thereof, which is traveled through by the monitoring unit 1227 according to FIG. 16. Reading out information which has been collected and possibly stored in an electronic storage of the monitoring unit is then also performed wirelessly. Also control signals to and from the monitoring unit 1227 are then transmitted in wireless technique. Clearly, in this case the monitoring unit as well as the stationary part of the apparatus are equipped with respective wireless transmitters and receivers to allow the monitoring unit 1227 to be practically ongoingly operated in SA with the exception e.g. of cleaning or maintenance cycles or timespans. Thus, if the standalone timespan $T_{SA}$ generically extends beyond the collecting timespan $T_{COL}$ it becomes possible to wirelessly read out the stored information from the still standalone operated monitoring unit 1227, then to evaluate such information at a stationary remote evaluation unit and to write an indication wirelessly back to a storage in the monitoring unit 1227 still applied to or over the respective device, e.g. information about test passed/test not passed. Thereby, the device 1201$_a$ still applied to the monitoring unit 1227 is in fact indirectly marked by such indication in its monitoring unit 1227. Based on such information in the monitoring unit 1227, devices which have not passed the test may be rejected, whereas devices which have passed the test are further conveyed to a destination for further use.

According to the embodiment of FIG. 16 out of the inline stream of devices 1201 devices 1201$_a$ may be selected randomly or regularly, e.g. every tenth device, to be inspected and/or tested.

Nevertheless and in a good embodiment of the invention all inline conveyed devices are inspected and/or tested. A respective monitoring unit is thereby applied to each of subsequently inline conveyed devices and a monitoring unit is respectively removed from every device at removal area 1211$_a$, e.g. inline conveyed thereto.

FIG. 17 shows in a representation in analogy to that of FIG. 16 schematically and simplified such a variant of the method according to the present invention and of the respective embodiment of an apparatus according to the invention and as today realized.

Devices 1301 are conveyed on a conveyor 1303 towards and into an application area 1305$_a$. The conveyor 1303 may be of any appropriate type so e.g. a band conveyor, a starwheel conveyor, etc.

Multiple monitoring units 1327 are ready for operation in an application area 1305$_a$ in standalone operation mode. As schematically shown in FIG. 18 each of the monitoring units 1327 comprises an electric power supply unit 1456 with a rechargeable battery or capacitor arrangement 1460 which may be recharged inductively by an inductively transmitted electric power signal $S_P$ e.g. to a receiver coil 1462 of unit 1456. In the application area 1305$_a$ the monitoring units 1327 are exposed to inductive charging by means of charging unit 1354.

After having been charged or recharged there a monitoring unit 1327 is applied to or over each of the inline arriving devices 1301. Each of the monitoring units 1327 further comprises as schematically shown in FIG. 18 a wireless transmission unit 1464 for wireless control input signals $S_{Ci}$. A controller unit 1310 (FIG. 17) for operation of the apparatus generates in the application area 1305$_a$ an initiating control signal $S_{Ci}$ which initiates information collecting and holding in the monitoring unit 1327 just before being applied to the respective device 1301. Thereby, such control signals $S_{Ci}$ may also be transmitted inductively via the charging unit 1354. The wirelessly transmitted control signal $S_{Ci}$ initiates, as by starting a system clock 521 according to FIG. 9, sampling and thus collecting information I (FIG. 18) as e.g. pressure values as was addressed above. Appropriately converted as e.g. analogue to digital converted, this information I is input to an electronic storage unit 1468 which in fact forms in this embodiment the holding unit of the monitoring unit. From the moment of the addressed initiation, the monitoring unit 1327 collects and holds information from or caused by the respective device 1301, e.g. in a table linking the time of collecting an information sample and the sample value.

The devices 1301, now with the respective monitoring units 1327 applied thereto, are conveyed by an arrangement of one or more than one conveyors 1370 which allow to stack flexibly a long conveying path in a minimal constructional volume. Thus, the conveyor arrangement 1370 downstream the application area 1305$_a$ comprises or even consists of band conveyors by which as schematically shown in FIG. 17 such long conveying path may be realized in a relatively small constructional volume. The devices 1301 together with the respective monitoring units 1327 applied thereover or thereon are transported by the conveyor arrangement 1370 at the same speed or rate as conveyed towards and into the application area 1305$_a$ by conveyor arrangement 1303.

Having been initiated as was described, each monitoring unit 1327 collects and holds information from or caused by the device 1301 it is applied to. In an information retrieving area 1372 a read-out initiation signal $S_{Co}$ is generated and wirelessly transmitted to the respective monitoring unit 1327 having arrived in the retrieving area 1372. Such control signal $S_{Co}$ may be generated e.g. by optically sensing arrival of a couple of monitoring unit and device in that area 1372. Upon such control signal $S_{Co}$ e.g. received by the monitoring unit 1327 at the wireless transmission—bidirectional—unit 1464 a control unit 1421 of the monitoring unit 1327 controls, as schematically shown by a switch $Q_2$ in FIG. 18, transmission of the data content in the electronic storage unit 1468 to the wireless transmission unit 1464. The data content which has been stored in electronic storage unit 1468 and which represents the collected information I sensed by collecting unit 1367 is output, $S_I$, via wireless transmission unit 1464 to the stationary reception and evaluation unit 1374 (FIG. 17). In reception and evaluation unit 1374 the result of inspection and/or testing the respective device 1372 is evaluated.

As schematically shown in FIG. 17 a result $R(S_M)$ is generated, which includes a marking signal $S_M$ which identifies, if, yes or no, the addressed device 1301 has fulfilled the inspection requirements and/or test requirements. The marking signal $S_M$ is wirelessly applied to the monitoring unit 1327 still applied to or over the respective device 1301 as shown in FIG. 17. The marking signal $S_M$ is e.g. applied via wireless transmission unit 1464 (FIG. 18). Thereby, the marking signal $S_M$ is stored e.g. in control unit 1421 of the monitoring 1327 as a two-state marking, schematically represented in FIGS. 17 and 18 by A/B, e.g. "A" for "device has passed the inspection or the test" and "B" for respectively "the device has not passed inspection and/or test". Please note that in FIG. 17 downstream applying the marking signal $S_M$, the respective monitoring units 1327 are shown with such markings "A" or "B". Still propagating downstream with the stream of monitoring units 1327 now provided with a respective marking "A" or "B" and still applied to or over the respective device 1301, the monitoring units 1327 arrive to a selection unit 1380. In this unit e.g. by optically detecting arrival of a respective couple of device and monitoring unit, the marking of the monitoring unit is read by a wireless reception unit 1382. The result of reading out the addressed marking controls by means of a control signal $S_{A/B}$ the selection unit represented in FIG. 17 schematically by switch $Q_3$. Devices which have been recognized as not fulfilling the inspection and/or the test are rejected—B—, whereas devices which have been recognized as fulfilling the addressed requirements—A—are passed to further exploitation.

Shortly before the addressed selection is performed the monitoring unit 1327 is removed from the device 1301 and is conveyed back to the application area 1305$_a$ as schematically shown in FIG. 17 by the arrow of backfeeding m. Due to the fact that reading out the respective marking by wireless reception unit 1382 is performed shortly ahead or shortly after removal of the respective monitoring unit 1327 from its device 1301, the proper selection may be made as shown by switch $Q_3$ upon the device now void of its accompanying monitoring unit. It is also possible to remove the respective monitoring unit shortly after the selection— $Q_3$— has been made.

As shown in FIG. 17 the control unit 1310 of the overall apparatus controls proper timing of the overall apparatus. The monitoring units 1327 are always in standalone operating mode SA. The electronic storage unit 1468, the marking e.g. in control unit 1421 etc. at each monitoring unit 1327 moved back along path m, are reset (not shown in FIG. 13) by a wireless resetting unit, resetting the respective monitoring unit via its wireless bidirectional transmitter unit 1464. If the monitoring unit consumes relatively much electric power, it is absolutely possible to electrically charge the rechargeable power unit in monitoring unit 1327 by signal $S_P$ during long timespans, e.g. substantially during standalone timespan $S_P$ or $T_{SA}$ as by an inductive loop along a major part of the trajectory path of the monitoring unit, as schematically shown in FIG. 17 at 1354$a$.

FIG. 19 shows the type of devices 1301 and of monitoring unit 1327 which are today applied to the embodiment as shown in FIG. 17. The devices 1301 are aerosol cans whereat leakiness is to be tested at and along the top wherein the spray valve arrangement 1502 is mounted. The cans 1301 are under overpressure so that there is no need to either pressurize or vacuumize the interspace 1515 within the monitoring unit 1327. There is provided in the monitoring unit 1327 an absolute pressure sensor 1505 mounted to a printed board 1527 which carries all the electronics of the monitoring unit 1327.

FIG. 20 represents different courses of absolute pressure in space 1515 as information collected by the absolute pressure sensor 1505 and stored in electronic storage on the board 1527 of the monitoring unit 1327. As initiation of collecting the information I (FIG. 18) is performed before the monitoring unit 1327 is applied with its sealing area 1504 on the can-device 1301$_a$, a pressure $P_p$ peak appears, which is indicative of whether the monitoring unit 1327 has properly been applied to the can-device 1301. A pressure course qualitatively according to (a) of FIG. 20 is indicative for a leaky can, a course qualitatively according to (b) indicates an unleaky can, whereas a course according to (c) is indicative for a leaky seal between can-device 1301 and the monitoring unit 1327. Please note that for high accuracy, the collecting timespan $T_{COL}$ indicated with approx. 30 sec. in FIG. 20 is long with respect to the high throughput rate of devices of e.g. 10 devices per second. This reveals the advantage of providing a long distance for information collection and holding as addressed by the conveyor arrangement 1370 of FIG. 17.

As wireless communication technique to and from the monitoring unit as for control signals as well as for reading out the content of the electronic storage unit 1468 of FIG. 14 e.g. Bluetooth or ANT technology may be used.

The invention claimed is:

1. Method of inline inspecting and/or testing devices, comprising:
providing at least one monitoring unit capable to be releasably applied to or over one of said devices and, in a standalone operating mode, to collect information from and/or caused by said device;
conveying devices inline towards and into an application area;
applying on or over a device out of said devices inline conveyed towards and into said application area said monitoring unit in said application area;
removing said monitoring unit from said device in a removal area and bringing said removed monitoring unit back to said application area;
by said monitoring unit, collecting information from or caused by said device to which the monitoring unit is applied to;
transmitting information depending from collected information in said monitoring unit to a remote unit which is stationary with respect to said inline conveying of said devices towards and into said application area;
evaluating information dependent from information as collected;
wherein:
said collecting is performed during a collecting timespan;
said monitoring unit is operated in standalone operating mode during a standalone timespan;
said monitoring unit being applied to or over said device during an application timespan;
said standalone timespan includes at least a part of said application timespan;
said collecting timespan includes at least a part of said part of said application timespan; and
said monitoring unit is electrically supplied at least during said standalone timespan by an electrical power supply source in said monitoring unit.

2. The method of claim 1, wherein said devices with said device on or over which said monitoring unit is applied are inline conveyed from said application area towards and into said removal area.

3. The method of claim 2, wherein said device with the monitoring unit applied thereon or thereover is kept stationary during a timespan of said conveying from said application area to said removal area.

4. The method of claim 1, wherein said application area and said removal area are provided at least substantially at the same locus or mutually remote.

5. The method of claim 1, wherein said application area and said removal area are provided substantially at the same locus and at least said device with the monitoring unit applied thereon or thereover is kept stationary during said application timespan.

6. The method of claim 1, wherein said collecting timespan starts before or with said application timespan.

7. The method of claim 1, wherein said collecting timespan starts before, with or after start of said standalone timespan.

8. The method of claim 1, wherein said standalone timespan of said monitoring unit is ongoing during said application timespan and during said monitoring unit being brought from said removal area back to said application area.

9. The method of claim 1, wherein said standalone timespan starts at the latest with start of said application timespan.

10. The method of claim 1, wherein said collecting timespan ends with or after said application timespan.

11. The method of claim 1, wherein said collecting timespan ends before, with or after the end of said standalone timespan.

12. The method of claim 1, wherein said standalone timespan ends before or after said transmitting.

13. The method of claim 1, wherein said transmitting is performed before, with or after the end of said application timespan.

14. The method of claim 1, wherein said information collected is at least one of gas pressure, a gas pressure course, an amount of a gas species in a gas, a time course of such amount, a temperature, a temperature course, an optical characteristic in the visible and/or invisible light-spectrum, a time course of such optical characteristic, a reaction upon a radiation, a course of such reaction, electric impedance, a time course of such impedance, a force, a time course of such force.

15. The method of claim 1, wherein said information as collected comprises an amount of a predetermined gas species in a gas surrounding said device, said collecting comprising collecting into and holding in a sample compartment in said monitoring unit a sample of said gas surrounding said device, an evaluating comprising gas analysis, said transmitting comprising establishing a gas flow communication from said compartment to said remote unit.

16. The method of claim 1, wherein said information collected comprises a gas pressure or gas pressure time course, said collecting comprising collecting pressure information by means of a pressure sensor arrangement applied by said monitoring unit to or adjacent to said device.

17. The method of claim 16, said device being a closed container, applying said monitoring unit resulting in a sealed interspace between said closed container and said monitoring unit, said pressure sensor arrangement sensing pressure in said interspace.

18. The method of claim 17, further comprising raising pressure in said interspace above or reducing said pressure in said interspace below a pressure prevailing in said closed container at least one of before and of during said standalone timespan.

19. The method of claim 16, said device being an open container, applying said monitoring unit resulting in sealingly applying said pressure sensor arrangement in a sealed flow communication with the inside of said open container and establishing a pressure difference between the inside of said container and the surrounding of said container once said sealed flow communication is established.

20. The method of claim 1, wherein said electric power supply source is at least once wirelessly charged at least one of before, during and after said standalone timespan.

21. The method of claim 1, further comprising performing said collecting at least one discrete time interval and transmitting said information dependent from said collected information during said time interval.

22. The method of claim 21, comprising performing said collecting at more than one discrete time interval and said transmitting during the respective time intervals.

23. The method of claim 21, at least one of said time intervals being in said standalone timespan.

24. The method of claim 1, wherein information dependent from said information as collected is held in said monitoring unit at least up to said transmitting.

25. The method of claim 1, wherein information dependent from said information as collected is evaluated in said monitoring unit, and said information transmitted comprises a result of said evaluation.

26. The method of claim 1, wherein information dependent from information as collected is held in said monitoring unit in an electronic data storage in said monitoring unit.

27. The method of claim 1, said transmitting being wirelessly performed from said monitoring unit.

28. The method of claim 1, wherein multiple of said monitoring units are provided and are subsequently applied to subsequent of said devices as in line conveyed towards and into said application area.

29. The method of claim 1, wherein multiple of said monitoring units are provided and are subsequently applied to all subsequent of said devices as inline conveyed towards and into said application area.

30. The method of claim 1, wherein information dependent from information as collected is evaluated, a result of said evaluating is stored in a storage in said monitoring unit, said stored result is read from said monitoring unit and a selecting unit is controlled by said readout result for selecting further processing of the respective device.

31. The method of claim 1, wherein said devices are inline conveyed from said application area towards and into said removal area, said conveying comprising inline conveying said devices by means of at least one band conveyer.

32. A method for manufacturing devices which have positively passed an inspection and/or a test, comprising providing uninspected and/or untested devices, inline inspecting and/or testing said uninspected and/or untested devices by the method of claim 1, an evaluating result assigned to a device indicating a positive inspection and/or test result establishing such device as having positively passed said inspection and/or test.

33. Inline device inspecting and/or testing apparatus, comprising:
at least one monitoring unit adapted to be releasably applied to or over one of said devices and, in a standalone operating mode, to collect information from and/or caused by said device; said monitoring unit being in standalone operating mode during a standalone timespan;
an applicator unit adapted to apply said monitoring unit to or over one of said devices;
a removal unit adapted to remove said monitoring unit from said device after an application timespan, initiated as said monitoring unit is applied to or over said device;
a conveyor adapted to inline convey said devices towards and into alignment with said applicator unit;
an arrangement adapted to bring said monitoring unit from said removal unit to said applicator unit;
a reception unit, stationary with respect to said conveyer, and adapted to receive information dependent from information as collected in said monitoring unit;
a remote unit, stationary with respect to said conveyer and with an input operationally connected to an output of said reception unit;
control means adapted to control said monitoring unit to collect said information during a collecting timespan;
said standalone timespan includes at least a part of said application timespan;
said collecting timespan is controlled by said control means to include at least a part of said part of said application timespan.

34. The apparatus of claim 33 comprising a conveyor adapted to inline convey said devices including a device with said monitoring unit applied thereon or thereover from said applicator unit towards and into alignment with said removal unit.

35. The apparatus of claim 34, comprising a stationary support station for at least one device along a conveying path from said applicator unit to said removal unit.

36. The apparatus of claim 35, wherein said collecting timespan is controlled by said control means to start before, with or after starting of said application timespan.

37. The apparatus of claim 33, wherein said applicator unit and said removal unit are at least substantially provided at the same locus or mutually remote.

38. The apparatus of claim 33, wherein said applicator unit and said removal unit are provided at the same locus and comprising a stationary support station for at least one device at said locus.

39. The apparatus of claim 33, wherein said collecting timespan is controlled by said control means to start before, with or after starting of said standalone timespan.

40. The apparatus of claim 33, wherein said monitoring unit is ongoingly operating in standalone mode during looping of said monitoring unit from said applicator unit to said removal unit and back to said applicator unit.

41. The apparatus of claim 33, wherein said monitoring unit is in standalone operating mode at the latest with start of said application timespan.

42. The apparatus of claim 33, wherein said control means control said collecting timespan to end before, with or after removing said monitoring unit from said device by said removal unit.

43. The apparatus of claim 33, wherein said collecting timespan is controlled by said control means to end before, with or after the end of said standalone timespan.

44. The apparatus of claim 33, wherein said standalone timespan ends before or after reception of said information by said reception unit.

45. The apparatus of claim 33, wherein said monitoring unit comprises means adapted to collect and hold information representing at least one of gas pressure, a gas pressure course, an amount of a gas species in a gas, a time course of such amount, a temperature, a temperature course, an optical characteristic in the visible and/or invisible light-spectrum, a time course of such optical characteristic, a reaction upon a radiation, a time course of such reaction, electric impedance, a time course of such impedance, a force, a time course of such force.

46. The apparatus of claim 33, wherein said monitoring unit comprises means adapted to collect and hold information representing an amount of a predetermined gas species in a gas surrounding said device, said means adapted to collect and hold said information in said monitoring unit comprising a sample compartment in said monitoring unit, said remote unit being adapted for gas analysis, said reception unit comprising an input gas flow line adapted to be controllably connected to said sample compartment.

47. The apparatus of claim 33, wherein said monitoring unit comprises a gas pressure sensor arrangement.

48. The apparatus of claim 47, said device being a closed container, said monitoring unit being adapted to be applied over said device and defining with said device a sealed interspace between said closed container and said monitoring unit, said pressure sensor arrangement being in operational connection with said interspace.

49. The apparatus of claim 48, further comprising means adapted to raise pressure in said interspace above or to reduce said pressure in said interspace below a pressure prevailing in said closed container one of before and of during said standalone timespan.

50. The apparatus of claim 47, said device being an open container, wherein said monitoring unit is adapted to sealingly apply said pressure sensor arrangement in a sealed flow communication with the inside of said open container and further comprising means adapted to establishing a pressure difference between the inside of said container and the surrounding of said container.

51. The apparatus of claim 33, wherein said monitoring unit comprises an electrical power supply unit adapted to electrically supply said monitoring unit at least during said standalone timespan.

52. The apparatus of claim 51, wherein said electric power supply unit is wirelessly chargeable.

53. The apparatus of claim 33, said control means being adapted to control said monitoring unit to collect said information as said monitoring unit is adjacent to said reception unit.

54. The apparatus of claim 53 comprising more than one of said reception units at distinct loci along a path of said monitoring unit, said control means being adapted to control said monitoring unit to collect said information as said monitoring unit is adjacent to respective ones of said reception units.

55. The apparatus of claim 53, said monitoring unit being in standalone mode during at least one of said collecting.

56. The apparatus of claim 33, said monitoring unit comprising a holding means for information dependent from information as collected.

57. The apparatus of claim 33 comprising an evaluation unit at least one of in said monitoring unit and in said remote unit, said evaluation unit being operationally connected or connectable to collecting means in said monitoring unit.

58. The apparatus of claim 33, said monitoring unit comprising an electronic data storage for holding information dependent from information as collected.

59. The apparatus of claim 33, said monitoring unit comprising a wireless transmission unit, said reception unit comprising a wireless receiver unit.

60. The apparatus of claim 59, an input of said wireless transmission unit being operationally connected to an output of an electronic data storage in said monitoring unit.

61. The apparatus of claim 33 comprising multiple of said monitoring units, said applicator unit being adapted to apply, subsequently, to subsequent of said devices as in line conveyed towards and into alignment with said applicator unit a monitoring unit, said removal unit being adapted to, subsequently, remove a monitoring unit from said devices.

62. The apparatus of claim 33 comprising multiple of said monitoring units, said applicator unit being adapted to apply, subsequently, to all subsequent of said devices as in line conveyed towards and into alignment with said applicator unit a monitoring unit, said removal unit being adapted to remove, subsequently, a monitoring unit from each of said devices.

63. The apparatus of claim 33, comprising an evaluation unit, an output of said evaluation unit being operationally connectable to a resettable storage in said monitoring unit.

64. The apparatus of claim 33 comprising a conveyer adapted to inline convey said devices including a device with said monitoring unit applied thereon or there over from said applicator unit towards and into alignment with said removal unit, said conveyor comprising at least one band conveyer.

* * * * *